United States Patent
Zhao et al.

(10) Patent No.: US 11,677,969 B2
(45) Date of Patent: Jun. 13, 2023

(54) METHOD AND APPARATUS FOR VIDEO CODING

(71) Applicant: Tencent America LLC, Palo Alto, CA (US)

(72) Inventors: Xin Zhao, San Diego, CA (US); Xiang Li, Los Gatos, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/823,831

(22) Filed: Mar. 19, 2020

(65) Prior Publication Data
US 2020/0304815 A1 Sep. 24, 2020

Related U.S. Application Data

(60) Provisional application No. 62/822,787, filed on Mar. 22, 2019.

(51) Int. Cl.
*H04N 19/44* (2014.01)
*H04N 19/119* (2014.01)
(Continued)

(52) U.S. Cl.
CPC ........... *H04N 19/44* (2014.11); *H04N 19/119* (2014.11); *H04N 19/132* (2014.11); *H04N 19/176* (2014.11); *H04N 19/96* (2014.11)

(58) Field of Classification Search
CPC .... H04N 19/176; H04N 19/119; H04N 19/96; H04N 19/44; H04N 19/60; H04N 19/174; H04N 19/132
See application file for complete search history.

(56) References Cited

U.S. PATENT DOCUMENTS

2011/0280804 A1  11/2011  McCurdy et al.
2012/0163455 A1*  6/2012  Zheng .................. H04N 19/134
                                                    375/E7.243
(Continued)

FOREIGN PATENT DOCUMENTS

CN     103636215 A  *  3/2014  ........... H04N 19/119
EP     1083752 A1       3/2001
(Continued)

OTHER PUBLICATIONS

Australian Office Action dated Sep. 8, 2022 in Application No. 2020245322. (5 pages).
(Continued)

*Primary Examiner* — Robert J Hance
(74) *Attorney, Agent, or Firm* — ArentFox Schiff LLP

(57) ABSTRACT

Aspects of the disclosure provide methods and an apparatus including processing circuitry that decodes coded information of a coding block (CB) in a picture from a coded video bitstream. The coded information indicates a width W and a height H of the CB. The processing circuitry partitions the CB into sub-processing units (SPUs) having a width being a minimum one of W and K and a height being a minimum one of H and K. At least one of the width W and the height H is larger than a processing data unit size K. The processing circuitry determines a partitioning structure to partition the SPUs based on the width, the height, and a maximum transform unit (TU) size M. At least one of the width and the height is larger than M. The processing circuitry partitions each of the SPUs into TUs of M×M based on the partitioning structure.

20 Claims, 48 Drawing Sheets

(51) Int. Cl.
*H04N 19/132* (2014.01)
*H04N 19/96* (2014.01)
*H04N 19/176* (2014.01)

(56) References Cited

U.S. PATENT DOCUMENTS

| | | | |
|---|---|---|---|
| 2017/0238001 A1* | 8/2017 | Li | H04N 19/593 |
| | | | 375/240.12 |
| 2018/0109812 A1* | 4/2018 | Tsai | H04N 19/157 |
| 2018/0192076 A1 | 7/2018 | Ikai et al. | |
| 2019/0075328 A1* | 3/2019 | Huang | H04N 19/134 |
| 2019/0166367 A1* | 5/2019 | Zhao | H04N 19/176 |
| 2019/0222859 A1* | 7/2019 | Chuang | H04N 19/70 |
| 2019/0349587 A1* | 11/2019 | Jang | H04N 19/186 |
| 2020/0204799 A1* | 6/2020 | Lee | H04N 19/11 |
| 2020/0252608 A1* | 8/2020 | Ramasubramonian | |
| | | | H04N 19/119 |
| 2020/0288122 A1* | 9/2020 | Kim | H04N 19/117 |
| 2021/0014492 A1* | 1/2021 | Wang | H04N 19/119 |
| 2021/0112284 A1* | 4/2021 | Zhang | H04N 19/176 |
| 2021/0281833 A1* | 9/2021 | Heo | H04N 19/176 |
| 2021/0329233 A1* | 10/2021 | Tsai | H04N 19/157 |
| 2021/0377526 A1* | 12/2021 | Lee | H04N 19/176 |
| 2021/0409707 A1* | 12/2021 | Wieckowski | H04N 19/119 |
| 2022/0191530 A1* | 6/2022 | Sim | H04N 19/82 |

FOREIGN PATENT DOCUMENTS

| | | | | |
|---|---|---|---|---|
| EP | 3261349 A1 | 12/2017 | | |
| JP | 4536913 B2 * | 9/2010 | | H04N 19/119 |
| KR | 20170136411 A | 12/2017 | | |
| TW | 201841501 A | 11/2018 | | |
| WO | 2017157249 A1 | 9/2017 | | |
| WO | 2018124653 A1 | 7/2018 | | |
| WO | 2019009540 A1 | 1/2019 | | |
| WO | WO-2019052254 A1 * | 3/2019 | | H04N 19/119 |
| WO | WO-2019203610 A1 * | 10/2019 | | H04N 19/119 |
| WO | WO-2020125595 A1 * | 6/2020 | | H04N 19/103 |
| WO | WO-2020141163 A1 * | 7/2020 | | H04N 19/119 |
| WO | 2020163182 A2 | 8/2020 | | |

OTHER PUBLICATIONS

Indian Office Action dated Jun. 22, 2022 in Application No. 202137047188. (6 pages).
A. Fuldseth et al., "Transform design for HEVC with 16 bit intermediate data representation", Joint Collaborative Team on Video Coding (JCT-VC) of ITU-T SG16 WP3 and ISO/IEC JTC1/SC29/WG11 5th Meeting: Geneva, CH, Mar. 16-23, 2011, Document: JCTVC-E243, pp. 1-16.
Supplementary European Office Action dated Nov. 18, 2022 in Application No. 20778398.6. (14 pages).
Canadian Office Action dated Nov. 28, 2022 in Application No. 3,133,103. (5 pages).
Zhao X et al: "Non-CE6: Configurable max transform size in VVC", 14. JVET Meeting; Mar. 19, 2019-Mar. 27, 2019; Geneva; (The Joint Video Exploration Team of ISO/IEC JTC1/SC29/WG11 and ITU-T SG.16 ), No. JVET-N0362, Mar. 17, 2019, pp. 1-8.
Zhao X et al: "Non-CE6: Joint proposal on configurable max transform size of JVET-N0362 and JVET-N0227", 14. JVET Meeting; Mar. 19, 2019-Mar. 27, 2019; Geneva; (The Joint Video Exploration Team of ISO/IEC JTC1/SC29/WG11 and ITU-T SG.16 ), No. JVET-N0808, Mar. 26, 2019, pp. 1-12.
Supplementary European Search Report dated Jan. 20, 2023 in Application No. 20778398.6. (13 pages).
C-W Hsu et al: "CE1-related: Constraint for binary and ternary partitions", 11. JVET Meeting; Jul. 11, 2018-Jul. 18, 2018; Ljubljana; (The Joint Video Exploration Team of ISO/IEC JTC1/SC29/WG11 and ITU-T SG.16), No. JVET-K0556, Jul. 16, 2018, pp. 1-3.
McCann et al., "Samsung's Response to the Call for Proposals on Video Compression Technology," Joint Collaborative Team on Video Coding (JCT-VC) of ITU-T SG16 WP3 and ISO/IEC JTC1/SC29/WG11, 1st Meeting: Dresden, DE, Apr. 15-23, 2010, JCTCV-A124, 40 pages.
Office Action in KR1020217012880, dated Mar. 20, 2023, 6 pages.
Panusopone et al., "Implicit Transform Unit Partitioning in HEVC," 2013 Picture Coding Symposium, Dec. 2013, pp. 213-216.

* cited by examiner

4x4 transform

8x8 transform

16x16 transform

FIG. 10D 32x32 transform

Continue from FIG. 11A bx,cj,bu,bf,bt,ci,-by,-bj,-bp,-ce,cc,bn,bl,ca,-cg,-br,-bh,-bw,ck,bv,bg,bs,ch,-bz,-bk,-bo,-cd,cd,bo,bk,bz,-ch,-bs,-bg,-bv,-ck,bw,bh,br,cg,-ca,-bl,-bn,-cc,ce,bp,bj,by,-ci,-bt,-bf,-bu,-cj,bx,bi,bq,cf,-cb,-bm}{ab,ac,-ac,-ab,-ab,-ac,ac,ab,ab,ac,-ac,-ab,-ab,-ac,ac,ab,ab,ac,-ac,-ab,-ab,-ac,ac,ab,ab,ac,-ac,-ab,-ab,-ac,ac,ab,ab,ac,-ac,-ab,-ab,-ac,ac,ab,ab,ac,-ac,-ab,-ab,-ac,ac,ab,ab,ac,-ac,-ab,-ab,-ac,ac,ab}
{bn,ce,-ca,-bj,-br,-ci,bw,bf,bv,-cj,-bs,-bi,-bz,cf,bo,bm,cd,-cb,-bk,-bq,-ch,bx,bg,bu,-ck,-bt,-bh,-by,cg,bp,bl,cc,-cc,-bl,-bp,-cg,by,bh,bt,ck,-bu,-bg,-bx,ch,bq,bk,cb,-cd,-bm,-bo,-cf,bz,bi,bs,cj,-bv,-bf,-bw,ci,br,bj,ca,-ce,-bn}{at,bc,-ay,-ap,-ax,bd,au,as,bb,-az,-aq,-aw,be,av,ar,ba,-ba,-ar,-av,-be,aw,aq,az,-bb,-as,-au,-bd,ax,ap,ay,-bc,-at,-at,-bc,ay,ap,ax,-bd,-au,-as,-bb,az,aq,aw,-be,-av,-ar,-ba,ba,ar,av,be,-aw,-aq,-az,bb,as,au,bd,-ax,-ap,-ay,bc,at}
{bo,ch,-bv,-bh,-ca,cc,bj,bt,-cj,-bq,-bm,-cf,bx,bf,by,-ce,-bl,-br,-ck,bs,bk,cd,-bz,-bg,-bw,cg,bn,bp,ci,-bu,-bi,-cb,cb,bi,bu,-ci,-bp,-bn,-cg,bw,bg,bz,-cd,-bk,-bs,ck,br,bl,ce,-by,-bf,-bx,cf,bm,bq,cj,-bt,-bj,-cc,ca,bh,bv,-ch,-bo}{aj,ao,-ak,-ai,-an,al,ah,am,-am,-ah,-al,an,ai,ak,-ao,-aj,-aj,-ao,ak,ai,an,-al,-ah,-am,am,ah,al,-an,-ai,-ak,ao,aj,aj,ao,-ak,-ai,-an,al,ah,am,-am,-ah,-al,an,ai,ak,-ao,-aj,-aj,-ao,ak,ai,an,-al,-ah,-am,am,ah,al,-an,-ai,-ak,ao,aj}{bp,ck,-bq,-bo,-cj,br,bn,ci,-bs,-bm,-ch,bt,bl,cg,-bu,-bk,-cf,bv,bj,ce,-bw,-bi,-cd,bx,bh,cc,-by,-bg,-cb,bz,bf,ca,-ca,-bf,-bz,cb,bg,by,-cc,-bh,-bx,cd,bi,bw,-ce,-bj,-bv,cf,bk,bu,-cg,-bl,-bt,ch,bm,bs,-ci,-bn,-br,cj,bo,bq,-ck,-bp}
{au,-be,-at,-av,bd,as,aw,-bc,-ar,-ax,bb,aq,ay,-ba,-ap,-az,az,ap,ba,-ay,-aq,-bb,ax,ar,bc,-aw,-as,-bd,av,at,be,-au,-au,be,at,av,-bd,-as,-aw,bc,ar,ax,-bb,-aq,-ay,ba,ap,az,-az,-ap,-ba,ay,aq,bb,-ax,-ar,-bc,aw,as,bd,-av,-at,-be,au}{bq,-ci,-bl,-bv,cd,bg,ca,-by,-bi,-cf,bt,bn,ck,-bo,-bs,cg,bj,bx,-cb,-bf,-cc,bw,bk,ch,-br,-bp,cj,bm,bu,-ce,-bh,-bz,bz,bh,ce,-bu,-bm,-cj,bp,br,-ch,-bk,-bw,cc,bf,cb,-bx,-bj,-cg,bs,bo,-ck,-bn,-bt,cf,bi,by,-ca,-bg,-cd,bv,bl,ci,-bq}
{ae,-ag,-ad,-af,af,ad,ag,-ae,-ae,ag,ad,af,-af,-ad,-ag,ae,ae,-ag,-ad,-af,af,ad,ag,-ae,-ae,ag,ad,af,-af,-ad,-ag,ae,ae,-ag,-ad,-af,af,ad,ag,-ae,-ae,ag,ad,af,-af,-ad,-ag,ae,ae,-ag,-ad,-af,af,ad,ag,-ae,-ae,ag,ad,af,-af,-ad,-ag,ae}{br,-cf,-bg,-cc,bu,bo,-ci,-bj,-bz,bx,bl,ck,-bm,-bw,ca,bi,ch,-bp,-bt,cd,bf,ce,-bs,-bq,cg,bh,cb,-bv,-bn,cj,bk,by,-by,-bk,-cj,bn,bv,-cb,-bh,-cg,bq,bs,-ce,-bf,-cd,bt,bp,-ch,-bi,-ca,bw,bm,-ck,-bl,-bx,bz,bj,ci,-bo,-bu,cc,bg,cf,-br}
{av,-bb,-ap,-bc,au,aw,-ba,-aq,-bd,at,ax,-az,-ar,-be,as,ay,-ay,-as,be,ar,az,-ax,-at,bd,aq,ba,-aw,-au,bc,ap,bb,-av,-av,bb,ap,bc,-au,-aw,ba,aq,bd,-at,-ax,az,ar,be,-as,-ay,ay,as,-be,-ar,-az,ax,at,-bd,-aq,-ba,aw,au,-bc,-ap,-bb,av}{bs,-cc,-bi,-cj,bl,bz,-bv,-bp,cf,bf,cg,-bo,-bw,by,bm,-ci,-bh,-cd,br,bt,-cb,-bj,-ck,bk,ca,-bu,-bq,ce,bg,ch,-bn,-bx,bx,bn,-ch,-bg,-ce,bq,bu,-ca,-bk,ck,bj,cb,-bt,-br,cd,bh,ci,-bm,-by,bw,bo,-cg,-bf,-cf,bp,bv,-bz,-bl,cj,bi,cc,-bs}
{ak,-am,-ai,ao,ah,an,-aj,-al,al,aj,-an,-ah,-ao,ai,am,-ak,-ak,am,ai,-ao,-ah,-an,aj,al,-al,-aj,an,ah,ao,-ai,-am,ak,ak,-am,-ai,ao,ah,an,-aj,-al,al,aj,-an,-ah,-ao,ai,am,-ak,-ak,am,ai,-ao,-ah,-an,aj,al,-al,-aj,an,ah,ao,-ai,-am,ak}{bt,-bz,-bn,cf,bh,ck,-bi,-ce,bo,by,-bu,-bs,ca,bm,-cg,-bg,-cj,bj,cd,-bp,-bx,bv,br,-cb,-bl,ch,bf,ci,-bk,-cc,bq,bw,-bw,-bq,cc,bk,-ci,-bf,-ch,bl,cb,-br,-bv,bx,bp,-cd,-bj,cj,bg,cg,-bm,-ca,bs,bu,-by,-bo,ce,bi,-ck,-bh,-cf,bn,bz,-bt}

FIG. 11B

*Continue from FIG. 11B*

*Continue from FIG. 11C* bs,-ck,br,-bl,ce,by,-bf,bx,cf,-bm,bq,-cj,-bt,bj,-cc,-ca,bh,-bv,-ch,bo,-bo,ch,bv,-bh,ca,cc,-bj,bt,cj,-bq,bm,-cf,-bx,bf,-by,-ce,bl,-br,ck,bs,-bk,cd,bz,-bg,bw,cg,-bn,bp,-ci,-bu,bi,-cb}
{ba,-ar,av,-be,-aw,aq,-az,-bb,as,-au,bd,ax,-ap,ay,bc,-at,at,-bc,-ay,ap,-ax,-bd,au,-as,bb,az,-aq,aw,be,-av,ar,-ba,-ba,ar,-av,be,aw,-aq,az,bb,-as,au,-bd,-ax,ap,-ay,-bc,at,-at,bc,ay,-ap,ax,bd,-au,as,-bb,-az,aq,-aw,-be,av,-ar,ba}{cc,-bl,bp,-cg,-by,bh,-bt,ck,bu,-bg,bx,ch,-bq,bk,-cb,-cd,bm,-bo,cf,bz,-bi,bs,-cj,-bv,bf,-bw,-ci,br,-bj,ca,ce,-bn,bn,-ce,-ca,bj,-br,ci,bw,-bf,bv,cj,-bs,bi,-bz,-cf,bo,-bm,cd,cb,-bk,bq,-ch,-bx,bg,-bu,-ck,bt,-bh,by,cg,-bp,bl,-cc}
{ac,-ab,ab,-ac,-ac,ab,-ab,ac,ac,-ab,ab,-ac,-ac,ab,-ab,ac,ac,-ab,ab,-ac,-ac,ab,-ab,ac,ac,-ab,ab,-ac,-ac,ab,-ab,ac,ac,-ab,ab,-ac,-ac,ab,-ab,ac,ac,-ab,ab,-ac,-ac,ab,-ab,ac,ac,-ab,ab,-ac,-ac,ab,-ab,ac}{cd,-bo,bk,-bz,-ch,bs,-bg,bv,-ck,-bw,bh,-br,cg,ca,-bl,bn,-cc,-ce,bp,-bj,by,ci,-bt,bf,-bu,cj,bx,-bi,bq,-cf,-cb,bm,-bm,cb,cf,-bq,bi,-bx,-cj,bu,-bf,bt,-ci,-by,bj,-bp,ce,cc,-bn,bl,-ca,-cg,br,-bh,bw,ck,-bv,bg,-bs,ch,bz,-bk,bo,-cd}
{bb,-au,aq,-ax,be,ay,-ar,at,-ba,-bc,av,-ap,aw,-bd,-az,as,-as,az,bd,-aw,ap,-av,bc,ba,-at,ar,-ay,-be,ax,-aq,au,-bb,-bb,au,-aq,ax,-be,-ay,ar,-at,ba,bc,-av,ap,-aw,bd,az,-as,as,-az,-bd,aw,-ap,av,-bc,-ba,at,-ar,ay,be,-ax,aq,-au,bb}{ce,-br,bf,-bs,cf,cd,-bq,bg,-bt,cg,cc,-bp,bh,-bu,ch,cb,-bo,bi,-bv,ci,ca,-bn,bj,-bw,cj,bz,-bm,bk,-bx,ck,by,-bl,bl,-by,-ck,bx,-bk,bm,-bz,-cj,bw,-bj,bn,-ca,-ci,bv,-bi,bo,-cb,-ch,bu,-bh,bp,-cc,-cg,bt,-bg,bq,-cd,-cf,bs,-bf,br,-ce}
{an,-ak,ah,-aj,am,ao,-al,ai,-ai,al,-ao,-am,aj,-ah,ak,-an,-an,ak,-ah,aj,-am,-ao,al,-ai,ai,-al,ao,am,-aj,ah,-ak,an,an,-ak,ah,-aj,am,ao,-al,ai,-ai,al,-ao,-am,aj,-ah,ak,-an,-an,ak,-ah,aj,-am,-ao,al,-ai,ai,-al,ao,am,-aj,ah,-ak,an}{cf,-bu,bj,-bl,bw,-ch,-cd,bs,-bh,bn,-by,cj,cb,-bq,bf,-bp,ca,ck,-bz,bo,-bg,br,-cc,-ci,bx,-bm,bi,-bt,ce,cg,-bv,bk,-bk,bv,-cg,-ce,bt,-bi,bm,-bx,ci,cc,-br,bg,-bo,bz,-ck,-ca,bp,-bf,bq,-cb,-cj,by,-bn,bh,-bs,cd,ch,-bw,bl,-bj,bu,-cf}
{bc,-ax,as,-aq,av,-ba,-be,az,-au,ap,-at,ay,-bd,-bb,aw,-ar,ar,-aw,bb,bd,-ay,at,-ap,au,-az,be,ba,-av,aq,-as,ax,-bc,-bc,ax,-as,aq,-av,ba,be,-az,au,-ap,at,-ay,bd,bb,-aw,ar,-ar,aw,-bb,-bd,ay,-at,ap,-au,az,-be,-ba,av,-aq,as,-ax,bc}{cg,-bx,bo,-bf,bn,-bw,cf,ch,-by,bp,-bg,bm,-bv,ce,ci,-bz,bq,-bh,bl,-bu,cd,cj,-ca,br,-bi,bk,-bt,cc,ck,-cb,bs,-bj,bj,-bs,cb,-ck,-cc,bt,-bk,bi,-br,ca,-cj,-cd,bu,-bl,bh,-bq,bz,-ci,-ce,bv,-bm,bg,-bp,by,-ch,-cf,bw,-bn,bf,-bo,bx,-cg}
{ag,-af,ae,-ad,ad,-ae,af,-ag,-ag,af,-ae,ad,-ad,ae,-af,ag,ag,-af,ae,-ad,ad,-ae,af,-ag,-ag,af,-ae,ad,-ad,ae,-af,ag,ag,-af,ae,-ad,ad,-ae,af,-ag,-ag,af,-ae,ad,-ad,ae,-af,ag,ag,-af,ae,-ad,ad,-ae,-af,ag}{ch,-ca,bt,-bm,bf,-bl,bs,-bz,cg,ci,-cb,bu,-bn,bg,-bk,br,-by,cf,cj,-cc,bv,-bo,bh,-bj,bq,-bx,ce,ck,-cd,bw,-bp,bi,-bi,bp,-bw,cd,-ck,-ce,bx,-bq,bj,-bh,bo,-bv,cc,-cj,-cf,by,-br,bk,-bg,bn,-bu,cb,-ci,-cg,bz,-bs,bl,-bf,bm,-bt,ca,-ch}{bd,-ba,ax,-au,ar,-ap,as,-av,ay,-bb,be,bc,-az,aw,-at,aq,-aq,at,-aw,az,-bc,-be,bb,-ay,av,-as,ap,-ar,au,-ax,ba,-bd,-bd,ba,-ax,au,-ar,ap,-as,av,-ay,bb,-be,-bc,az,-aw,at,-aq,aq,-at,aw,-az,bc,be,-bb,ay,-av,as,-ap,ar,-au,ax,-ba,bd}{ci,-cd,by,-bt,bo,-bj,bf,-bk,bp,-bu,bz,-ce,cj,ch,-cc,bx,-bs,bn,-bi,bg,-bl,bq,-bv,ca,-cf,ck,cg,-cb,bw,-br,bm,-bh,bh,-bm,br,-bw,cb,-cg,-ck,cf,-ca,bv,-bq,bl,-bg,bi,-bn,bs,-bx,cc,-ch,-cj,ce,-bz,bu,-bp,bk,-bf,bj,-bo,bt,-by,cd,-ci}{ao,-an,am,-al,ak,-aj,ai,-ah,ah,-ai,aj,-ak,al,-

*FIG. 11D*

Continue from FIG. 11D am,an,-ao,-ao,an,-am,al,-ak,aj,-ai,ah,-ah,ai,-aj,ak,-al,am,-an,ao,ao,-an,am,-al,ak,-aj,ai,-ah,ah,-ai,aj,-ak,al,-am,an,-ao,-ao,an,-am,al,-ak,aj,-ai,ah,-ah,ai,-aj,ak,-al,am,-an,ao}{cj,-cg,cd,-ca,bx,-bu,br,-bo,bl,-bi,bf,-bh,bk,-bn,bq,-bt,bw,-bz,cc,-cf,ci,ck,-ch,ce,-cb,by,-bv,bs,-bp,bm,-bj,bg,-bg,bj,-bm,bp,-bs,bv,-by,cb,-ce,ch,-ck,-ci,cf,-cc,bz,-bw,bt,-bq,bn,-bk,bh,-bf,bi,-bl,bo,-br,bu,-bx,ca,-cd,cg,-cj}

{be,-bd,bc,-bb,ba,-az,ay,-ax,aw,-av,au,-at,as,-ar,aq,-ap,ap,-aq,ar,-as,at,-au,av,-aw,ax,-ay,az,-ba,bb,-bc,bd,-be,-be,bd,-bc,bb,-ba,az,-ay,ax,-aw,av,-au,at,-as,ar,-aq,ap,-ap,aq,-ar,as,-at,au,-av,aw,-ax,ay,-az,ba,-bb,bc,-bd,be}{ck,-cj,ci,-ch,cg,-cf,ce,-cd,cc,-cb,ca,-bz,by,-bx,bw,-bv,bu,-bt,bs,-br,bq,-bp,bo,-bn,bm,-bl,bk,-bj,bi,-bh,bg,-bf,bf,-bg,bh,-bi,bj,-bk,bl,-bm,bn,-bo,bp,-bq,br,-bs,bt,-bu,bv,-bw,bx,-by,bz,-ca,cb,-cc,cd,-ce,cf,-cg,ch,-ci,cj,-ck}} where

Transform basis functions of DCT-2, DST-7 and DCT-8 for N-point input

| Transform Type | Basis function $T_i(j)$, $i,j=0, 1,..., N-1$ |
|---|---|
| DCT-2 | $T_i(j) = \omega_0 \cdot \sqrt{\frac{2}{N}} \cdot \cos\left(\frac{\pi \cdot i \cdot (2j+1)}{2N}\right)$ <br> where $\omega_0 = \begin{cases} \sqrt{\frac{2}{N}} & i = 0 \\ 1 & i \neq 0 \end{cases}$ |
| DCT-8 | $T_i(j) = \sqrt{\frac{4}{2N+1}} \cdot \cos\left(\frac{\pi \cdot (2i+1) \cdot (2j+1)}{4N+2}\right)$ |
| DST-7 | $T_i(j) = \sqrt{\frac{4}{2N+1}} \cdot \sin\left(\frac{\pi \cdot (2i+1) \cdot (j+1)}{2N+1}\right)$ |

FIG. 12

| mts_idx | Transform Type Horizontal | Transform type Vertical | |
|---|---|---|---|
| -1 | 0 | 0 | 1301 |
| 0 | 1 | 1 | 1302 |
| 1 | 2 | 1 | 1303 |
| 2 | 1 | 2 | 1304 |
| 3 | 2 | 2 | 1305 |

Transform Type
0 – DCT2
1 – DST7
2 – DCT8

FIG. 13

4-point DST-7

{ a, b, c, d }
{ c, c, 0, -c }
{ d, -a, -c, b }
{ b, -d, c, -a } where {a, b, c, d} = { 29, 55, 74, 84}

FIG. 14A

8-point DST-7:

{ a, b, c, d, e, f, g, h,}
{ c, f, h, e, b, -a, -d, -g,}
{ e, g, b, -c, -h, -d, a, f,}
{ g, c, -d, -f, a, h, b, -e,}
{ h, -a, -g, b, f, -c, -e, d,}
{ f, -e, -a, g, -d, -b, h, -c,}
{ d, -h, e, -a, -c, g, -f, b,}
{ b, -d, f, -h, g, -e, c, -a,} where {a, b, c, d, e, f, g, h} = { 17, 32, 46, 60, 71, 78, 85, 86}

FIG. 14B

16-point DST-7

{ a, b, c, d, e, f, g, h, i, j, k, l, m, n, o, p,}
{ c, f, i, l, o, o, l, i, f, c, 0, -c, -f, -i, -l, -o,}
{ e, j, o, m, h, c, -b, -g, -l, -p, -k, -f, -a, d, i, n,}
{ g, n, l, e, -b, -i, -p, -j, -c, d, k, o, h, a, -f, -m,}
{ i, o, f, -c, -l, -l, -c, f, o, i, 0, -i, -o, -f, c, l,}
{ k, k, 0, -k, -k, 0, k, k, 0, -k, -k, 0, k, k, 0, -k,}
{ m, g, -f, -n, -a, l, h, -e, -o, -b, k, i, -d, -p, -c, j,}
{ o, c, -l, -f, i, l, -f, -l, c, o, 0, -o, -c, l, f, -i,}
{ p, -a, -o, b, n, -c, -m, d, l, -e, -k, f, j, -g, -i, h,}
{ n, -e, -i, j, d, -o, a, m, -f, -h, k, c, -p, b, l, -g,}
{ l, -i, -c, o, -f, -f, o, -c, -i, l, 0, -l, i, c, -o, f,}
{ j, -m, c, g, -p, f, d, -n, i, a, -k, l, -b, -h, o, -e,}
{ h, -p, i, -a, -g, o, -j, b, f, -n, k, -c, -e, m, -l, d,}
{ f, -l, o, -i, c, c, -i, o, -l, f, 0, -f, l, -o, i, -c,}
{ d, -h, l, -p, m, -i, e, -a, -c, g, -k, o, -n, j, -f, b,}
{ b, -d, f, -h, j, -l, n, -p, o, -m, k, -i, g, -e, c, -a,} where {a, b, c, d, e, f, g, h, i, j, k, l, m, n, o, p} = {9, 17, 25, 33, 41, 49, 56, 62, 66, 72, 77, 81, 83, 87, 89, 90}

*FIG. 14C*

32-point DST-7:

{a,b,c,d,e,f,g,h,i,j,k,l,m,n,o,p,q,r,s,t,u,v,w,x,y,z,A,B,C,D,E,F,}
{c,f,i,l,o,r,u,x,A,D,F,C,z,w,t,q,n,k,h,e,b,-a,-d,-g,-j,-m,-p,-s,-v,-y,-B,-E,}{e,j,o,t,y,D,D,y,t,o,j,e,0,-e,-j,-o,-t,-y,-D,-D,-y,-t,-o,-j,-e,0,e,j,o,t,y,D,}{g,n,u,B,D,w,p,i,b,-e,-l,-s,-z,-F,-y,-r,-k,-d,c,j,q,x,E,A,t,m,f,-a,-h,-o,-v,-C,}{i,r,A,C,t,k,b,-g,-p,-y,-E,-v,-m,-d,e,n,w,F,x,o,f,-c,-l,-u,-D,-z,-q,-h,a,j,s,B,}{k,v,F,u,j,-a,-l,-w,-E,-t,-i,b,m,x,D,s,h,-c,-n,-y,-C,-r,-g,d,o,z,B,q,f,-e,-p,-A,}
{m,z,z,m,0,-m,-z,-z,-m,0,m,z,z,m,0,-m,-z,-z,-m,0,m,z,z,m,0,-m,-z,-z,-m,0,m,z,}
{o,D,t,e,-j,-y,-y,-j,e,t,D,o,0,-o,-D,-t,-e,j,y,y,j,-e,-t,-D,-o,0,o,D,t,e,-j,-y,}
{q,E,n,-c,-t,-B,-k,f,w,y,h,-i,-z,-v,-e,l,C,s,b,-o,-F,-p,a,r,D,m,-d,-u,-A,-j,g,x,}
{s,A,h,-k,-D,-p,c,v,x,e,-n,-F,-m,f,y,u,b,-q,-C,-j,i,B,r,-a,-t,-z,-g,l,E,o,-d,-w,}
{u,w,b,-s,-y,-d,q,A,f,-o,-C,-h,m,E,j,-k,-F,-l,i,D,n,-g,-B,-p,e,z,r,-c,-x,-t,a,v,}
{w,s,-d,-A,-o,h,E,k,-l,-D,-g,p,z,c,-t,-v,a,x,r,-e,-B,-n,i,F,j,-m,-C,-f,q,y,b,-u,}
{y,o,-j,-D,-e,t,t,-e,-D,-j,o,y,0,-y,-o,j,D,e,-t,-t,e,D,j,-o,-y,0,y,o,-j,-D,-e,t,}
{A,k,-p,-v,e,F,f,-u,-q,j,B,a,-z,-l,o,w,-d,-E,-g,t,r,-i,-C,-b,y,m,-n,-x,c,D,h,-s,}
{C,g,-v,-n,o,u,-h,-B,a,D,f,-w,-m,p,t,-i,-A,b,E,e,-x,-l,q,s,-j,-z,c,F,d,-y,-k,r,}
{E,c,-B,-f,y,i,-v,-l,s,o,-p,-r,m,u,-j,-x,g,A,-d,-D,a,F,b,-C,-e,z,h,-w,-k,t,n,-q,}
{F,-a,-E,b,D,-c,-C,d,B,-e,-A,f,z,-g,-y,h,x,-i,-w,j,v,-k,-u,l,t,-m,-s,n,r,-o,-q,p,}
{D,-e,-y,j,t,-o,-o,t,j,-y,-e,D,0,-D,e,y,-j,-t,o,o,-t,-j,y,e,-D,0,D,-e,-y,j,t,-o,}
{B,-i,-s,r,j,-A,-a,C,-h,-t,q,k,-z,-b,D,-g,-u,p,l,-y,-c,E,-f,-v,o,m,-x,-d,F,-e,-w,n,}
{z,-m,-m,z,0,-z,m,m,-z,0,z,-m,-m,z,0,-z,m,m,-z,0,z,-m,-m,z,0,-z,m,m,-z,0,z,-m,}
{x,-q,-g,E,-j,-n,A,-c,-u,t,d,-B,m,k,-D,f,r,-w,-a,y,-p,-h,F,-i,-o,z,-b,-v,s,e,-C,l,}
{v,-u,-a,w,-t,-b,x,-s,-c,y,-r,-d,z,-q,-e,A,-p,-f,B,-o,-g,C,-n,-h,D,-m,-i,E,-l,-j,F,-k,}
{t,-y,e,o,-D,j,j,-D,o,e,-y,t,0,-t,y,-e,-o,D,-j,-j,D,-o,-e,y,-t,0,t,-y,e,o,-D,j,}
{r,-C,k,g,-y,v,-d,-n,F,-o,-c,u,-z,h,j,-B,s,-a,-q,D,-l,-f,x,-w,e,m,-E,p,b,-t,A,-i,}
{p,-F,q,-a,-o,E,-r,b,n,-D,s,-c,-m,C,-t,d,l,-B,u,-e,-k,A,-v,f,j,-z,w,-g,-i,y,-x,h,}
{n,-B,w,-i,-e,s,-F,r,-d,-j,x,-A,m,a,-o,C,-v,h,f,-t,E,-q,c,k,-y,z,-l,-b,p,-D,u,-g,}
{l,-x,C,-q,e,g,-s,E,-v,j,b,-n,z,-A,o,-c,-i,u,-F,t,-h,-d,p,-B,y,-m,a,k,-w,D,-r,f,}
{j,-t,D,-y,o,-e,-e,o,-y,D,-t,j,0,-j,t,-D,y,-o,e,e,-o,y,-D,t,-j,0,j,-t,D,-y,o,-e,}
{h,-p,x,-F,y,-q,i,-a,-g,o,-w,E,-z,r,-j,b,f,-n,v,-D,A,-s,k,-c,-e,m,-u,C,-B,t,-l,d,}
{f,-l,r,-x,D,-C,w,-q,k,-e,-a,g,-m,s,-y,E,-B,v,-p,j,-d,-b,h,-n,t,-z,F,-A,u,-o,i,-c,}
{d,-h,l,-p,t,-x,B,-F,C,-y,u,-q,m,-i,e,-a,-c,g,-k,o,-s,w,-A,E,-D,z,-v,r,-n,j,-f,b,}
{b,-d,f,-h,j,-l,n,-p,r,-t,v,-x,z,-B,D,-F,E,-C,A,-y,w,-u,s,-q,o,-m,k,-i,g,-e,c,-a,} where{a,b,c,d,e,f,g,h,i,j,k,l,m,n,o,p,q,r,s,t,u,v,w,x,y,z,A,B,C,D,E,F}={4,9,13,17,21,26,30,34,38,42,45,50,53,56,60,63,66,68,72,74,77,78,80,82,84,85,86,88,88,89,90,90}

*FIG. 14D*

4-point DCT-8

{ a, b, c, d,}
{ b, 0, -b, -b,}
{ c, -b, -d, a,}
{ d, -b, a, -c,} where {a, b, c, d} = { 84,74,55,29}

FIG. 15A

8-point DCT-8:

{ a, b, c, d, e, f, g, h,}
{ b, e, h, -g, -d, -a, -c, -f,}
{ c, h, -e, -a, -f, g, b, d,}
{ d, -g, -a, -h, c, e, -f, -b,}
{ e, -d, -f, c, g, -b, -h, a,}
{ f, -a, g, e, -b, h, d, -c,}
{ g, -c, b, -f, -h, d, -a, e,}
{ h, -f, d, -b, a, -c, e, -g,} where {a, b, c, d, e, f, g, h} = { 86,85,78,71,60,46,32,17}

FIG. 15B

16-point DCT-8

{ a, b, c, d, e, f, g, h, i, j, k, l, m, n, o, p,}
{ b, e, h, k, n, 0, -n, -k, -h, -e, -b, -b, -e, -h, -k, -n,}
{ c, h, m, -p, -k, -f, -a, -e, -j, -o, n, i, d, b, g, l,}
{ d, k, -p, -i, -b, -f, -m, n, g, a, h, o, -l, -e, -c, -j,}
{ e, n, -k, -b, -h, 0, h, b, k, -n, -e, -e, -n, k, b, h,}
{ f, 0, -f, -f, 0, f, f, 0, -f, -f, 0, f, f, 0, -f, -f,}
{ g, -n, -a, -m, h, f, -o, -b, -l, i, e, -p, -c, -k, j, d,}
{ h, -k, -e, n, b, 0, -b, -n, e, k, -h, -h, k, e, -n, -b,}
{ i, -h, -j, g, k, -f, -l, e, m, -d, -n, c, o, -b, -p, a,}
{ j, -e, -o, a, -n, -f, i, k, -d, -p, b, -m, -g, h, l, -c,}
{ k, -b, n, h, -e, 0, e, -h, -n, b, -k, -k, b, -n, -h, e,}
{ l, -b, i, o, -e, f, -p, -h, c, -m, -k, a, -j, -n, d, -g,}
{ m, -e, d, -l, -n, f, -c, k, o, -g, b, -j, -p, h, -a, i,}
{ n, -h, b, -e, k, 0, -k, e, -b, h, -n, -n, h, -b, e, -k,}
{ o, -k, g, -c, b, -f, j, -n, -p, l, -h, d, -a, e, -i, m,}
{ p, -n, l, -j, h, -f, d, -b, a, -c, e, -g, i, -k, m, -o,} where {a, b, c, d, e, f, g, h, i, j, k, l, m, n, o, p} = {
90,89,87,83,81,77,72,66,62,56,49,41,33,25,17, 9}

*FIG. 15C*

32-pointDCT-8:

{a,b,c,d,e,f,g,h,i,j,k,l,m,n,o,p,q,r,s,t,u,v,w,x,y,z,A,B,C,D,E,F,}
{b,e,h,k,n,q,t,w,z,C,F,-E,-B,-y,-v,-s,-p,-m,-j,-g,-d,-a,-c,-f,-i,-l,-o,-r,-u,-x,-A,-D,}
{c,h,m,r,w,B,0,-B,-w,-r,-m,-h,-c,-c,-h,-m,-r,-w,-B,0,B,w,r,m,h,c,c,h,m,r,w,B,}
{d,k,r,y,F,-A,-t,-m,-f,-b,-i,-p,-w,-D,C,v,o,h,a,g,n,u,B,-E,-x,-q,-j,-c,-e,-l,-s,-z,}
{e,n,w,F,-y,-p,-g,-c,-l,-u,-D,A,r,i,a,j,s,B,-C,-t,-k,-b,-h,-q,-z,E,v,m,d,f,o,x,}
{f,q,B,-A,-p,-e,-g,-r,-C,z,o,d,h,s,D,-y,-n,-c,-i,-t,-E,x,m,b,j,u,F,-w,-l,-a,-k,-v,}
{g,t,0,-t,-g,-g,-t,0,t,g,g,t,0,-t,-g,-g,-t,0,t,g,g,t,0,-t,-g,-g,-t,0,t,g,g,t,}
{h,w,-B,-m,-c,-r,0,r,c,m,B,-w,-h,-h,-w,B,m,c,r,0,-r,-c,-m,-B,w,h,h,w,-B,-m,-c,-r,}
{i,z,-w,-f,-l,-C,t,c,o,F,-q,-a,-r,E,n,d,u,-B,-k,-g,-x,y,h,j,A,-v,-e,-m,-D,s,b,p,}
{j,C,-r,-b,-u,z,g,m,F,-o,-e,-x,w,d,p,-E,-l,-h,-A,t,a,s,-B,-i,-k,-D,q,c,v,-y,-f,-n,}
{k,F,-m,-i,-D,o,g,B,-q,-e,-z,s,c,x,-u,-a,-v,w,b,t,-y,-d,-r,A,f,p,-C,-h,-n,E,j,l,}
{l,-E,-h,-p,A,d,t,-w,-a,-x,s,e,B,-o,-i,-F,k,m,-D,-g,-q,z,c,u,-v,-b,-y,r,f,C,-n,-j,}
{m,-B,-c,-w,r,h,0,-h,-r,w,c,B,-m,-m,B,c,w,-r,-h,0,h,r,-w,-c,-B,m,m,-B,-c,-w,r,h,}
{n,-y,-c,-D,i,s,-t,-h,E,d,x,-o,-m,z,b,C,-j,-r,u,g,-F,-e,-w,p,l,-A,-a,-B,k,q,-v,-f,}
{o,-v,-h,C,a,D,-g,-w,n,p,-u,-i,B,b,E,-f,-x,m,q,-t,-j,A,c,F,-e,-y,l,r,-s,-k,z,d,}
{p,-s,-m,v,j,-y,-g,B,d,-E,-a,-F,c,C,-f,-z,i,w,-l,-t,o,q,-r,-n,u,k,-x,-h,A,e,-D,-b,}
{q,-p,-r,o,s,-n,-t,m,u,-l,-v,k,w,-j,-x,i,y,-h,-z,g,A,-f,-B,e,C,-d,-D,c,E,-b,-F,a,}
{r,-m,-w,h,B,-c,0,c,-B,-h,w,m,-r,-r,m,w,-h,-B,c,0,-c,B,h,-w,-m,r,r,-m,-w,h,B,-c,}
{s,-j,-B,a,-C,-i,t,r,-k,-A,b,-D,-h,u,q,-l,-z,c,-E,-g,v,p,-m,-y,d,-F,-f,w,o,-n,-x,e,}
{t,-g,0,g,-t,-t,g,0,-g,t,t,-g,0,g,-t,-t,g,0,-g,t,t,-g,0,g,-t,-t,g,0,-g,t,t,-g,}
{u,-d,B,n,-k,-E,g,-r,-x,a,-y,-q,h,-F,-j,o,A,-c,v,t,-e,C,m,-l,-D,f,-s,-w,b,-z,-p,i,}
{v,-a,w,u,-b,x,t,-c,y,s,-d,z,r,-e,A,q,-f,B,p,-g,C,o,-h,D,n,-i,E,m,-j,F,l,-k,}
{w,-c,r,B,-h,m,0,-m,h,-B,-r,c,-w,-w,c,-r,-B,h,-m,0,m,-h,B,r,-c,w,w,-c,r,B,-h,m,}
{x,-f,m,-E,-q,b,-t,-B,j,-i,A,u,-c,p,F,-n,e,-w,-y,g,-l,D,r,-a,s,C,-k,h,-z,-v,d,-o,}
{y,-i,h,-x,-z,j,-g,w,A,-k,f,-v,-B,l,-e,u,C,-m,d,-t,-D,n,-c,s,E,-o,b,-r,-F,p,-a,q,}
{z,-l,c,-q,E,u,-g,h,-v,-D,p,-b,m,-A,-y,k,-d,r,-F,-t,f,-i,w,C,-o,a,-n,B,x,-j,e,-s,}
{A,-o,c,-j,v,F,-t,h,-e,q,-C,-y,m,-a,l,-x,-D,r,-f,g,-s,E,w,-k,b,-n,z,B,-p,d,-i,u,}
{B,-r,h,-c,m,-w,0,w,-m,c,-h,r,-B,-B,r,-h,c,-m,w,0,-w,m,-c,h,-r,B,B,-r,h,-c,m,-w,}
{C,-u,m,-e,d,-l,t,-B,-D,v,-n,f,-c,k,-s,A,E,-w,o,-g,b,-j,r,-z,-F,x,-p,h,-a,i,-q,y,}
{D,-x,r,-l,f,-a,g,-m,s,-y,E,C,-w,q,-k,e,-b,h,-n,t,-z,F,B,-v,p,-j,d,-c,i,-o,u,-A,}
{E,-A,w,-s,o,-k,g,-c,b,-f,j,-n,r,-v,z,-D,-F,B,-x,t,-p,l,-h,d,-a,e,-i,m,-q,u,-y,C,}
{F,-D,B,-z,x,-v,t,-r,p,-n,l,-j,h,-f,d,-b,a,-c,e,-g,i,-k,m,-o,q,-s,u,-w,y,-A,C,-E,} where{a,b,c,d,e,f,g,h,i,j,k,l,m,n,o,p,q,r,s,t,u,v,w,x,y,z,A,B,C,D,E,F}={90,90,89,88,88,86,85,84,82,80,78,77,74,72,68,66,63,60,56,53,50,45,42,38,34,30,26,21,17,13,9,4}

FIG. 15D

Number of sub-partitions depending on the block size

| Block Size | Number of Sub-Partitions |
|---|---|
| 4 × 4 | Not divided |
| 4 × 8 and 8 × 4 | 2 |
| All other cases | 4 |

*FIG. 16*

| coding_unit( x0, y0, cbWidth, cbHeight, treeType ) { | Descriptor |
|---|---|
|   if( tile_group_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] == 0 && tile_group_type != I ) | |
|       pred_mode_flag | ae(v) |
|     if( ( ( tile_group_type == I && cu_skip_flag[ x0 ][ y0 ] == 0 ) \|\| <br>       ( tile_group_type != I && CuPredMode[ x0 ][ y0 ] != MODE_INTRA ) ) && <br>       sps_ibc_enabled_flag ) | |
|       pred_mode_ibc_flag | ae(v) |
|   } | |
|   if( CuPredMode[ x0 ][ y0 ] == MODE_INTRA ) { | |
|     if( sps_pcm_enabled_flag && <br>       cbWidth >= MinIpcmCbSizeY && cbWidth <= MaxIpcmCbSizeY && <br>       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType == SINGLE_TREE \|\| treeType == DUAL_TREE_LUMA ) { | |
|         if( ( y0 % CtbSizeY ) > 0 ) | |
|           intra_luma_ref_idx[ x0 ][ y0 ] | ae(v) |

*FIG. 19A*

| | |
|---|---|
| *Continue from FIG. 19A* | 1910 |
| if( intra_luma_ref_idx[ x0 ][ y0 ] = = 0 &&<br>  ( cbWidth <= MaxTbSizeY \|\| cbHeight <= MaxTbSizeY ) &&<br>  ( cbWidth * cbHeight > MinTbSizeY * MinTbSizeY )) | |
|   intra_subpartitions_mode_flag[ x0 ][ y0 ] | ae(v) |
| if( intra_subpartitions_mode_flag[ x0 ][ y0 ] = = 1 &&<br>  cbWidth <= MaxTbSizeY && cbHeight <= MaxTbSizeY ) | |
|   intra_subpartitions_split_flag[ x0 ][ y0 ] | ae(v) |
| if( intra_luma_ref_idx[ x0 ][ y0 ] = = 0 &&<br>  intra_subpartitions_mode_flag[ x0 ][ y0 ] = = 0 ) | |
|   intra_luma_mpm_flag[ x0 ][ y0 ] | ae(v) |
| if( intra_luma_mpm_flag[ x0 ][ y0 ] ) | |
|   intra_luma_mpm_idx[ x0 ][ y0 ] | ae(v) |
| else | |
|   intra_luma_mpm_remainder[ x0 ][ y0 ] | ae(v) |
| } | |
| if( treeType = = SINGLE_TREE \|\| treeType = = DUAL_TREE_CHROMA ) | |
|   intra_chroma_pred_mode[ x0 ][ y0 ] | ae(v) |
| } | |
| } else if( treeType != DUAL_TREE_CHROMA ) { /* MODE_INTER or MODE_IBC */ | |
| ...... | |
| } | |

*FIG. 19B*

SVT-V, position 0

SVT-V, position 1 w1 = ½ w or ¼ w

SVT-H, position 0

SVT-H, position 1 h1 = ½ h or ¼ h

Sequence parameter set RBSP syntax

| seq_parameter_set_rbsp() { | Descriptor |
|---|---|
| sps_seq_parameter_set_id | ue(v) |
| ... | |
| sps_mts_intra_enabled_flag | u(1) |
| sps_mts_inter_enabled_flag | u(1) |
| sps_sbt_enable_flag | u(1) |
| rbsp_trailing_bits() | |
| } | |

General slice header syntax

| slice_header( ) { | Descriptor |
|---|---|
|   slice_pic_parameter_set_id | ue(v) |
|   slice_address | u(v) |
|   slice_type | ue(v) |
|   if( slice_type != I ) { | |
|     log2_diff_ctu_max_bt_size | ue(v) |
|     if( sps_sbtmvp_enabled_flag ) { | |
|       sbtmvp_size_override_flag | u(1) |
|       if( sbtmvp_size_override_flag ) | |
|         log2_sbtmvp_active_size_minus2 | u(3) |
|     } | |
|     if( sps_temporal_mvp_enabled_flag ) | |
|       slice_temporal_mvp_enabled_flag | u(1) |
|     if( slice_type == B ) | |
|       mvd_l1_zero_flag | u(1) |
|     if( slice_temporal_mvp_enabled_flag ) { | |
|       if( slice_type == B ) | |
|         collocated_from_l0_flag | u(1) |
|     } | |
|     six_minus_max_num_merge_cand | ue(v) |
|     if( sps_sbt_enable_flag) | |
|       slice_max_sbt_size_64_flag | u(1) |
|   } | |
|   if ( sps_alf_enabled_flag ) { | |
|     slice_alf_enabled_flag | u(1) |
|     if( slice_alf_enabled_flag ) | |
|       alf_data( ) | |
|   } | |
|   dep_quant_enabled_flag | u(1) |
|   if( !dep_quant_enabled_flag ) | |
|     sign_data_hiding_enabled_flag | u(1) |
|   byte_alignment( ) | |
| } | |

Coding unit syntax

| coding_unit( x0, y0, cbWidth, cbHeight, treeType ) { | Descriptor |
|---|---|
| ... | |
|   if( CuPredMode[ x0 ][ y0 ] != MODE_INTRA && cu_skip_flag[ x0 ][ y0 ] == 0 ) | |
|     cu_cbf | ae(v) |
|   if( cu_cbf ) { | |
|     if( CuPredMode[ x0 ][ y0 ] != MODE_INTRA && sps_sbt_enable_flag) { | |
|       if( cbWidth <= maxSbtSize && cbHeight <= maxSbtSize ) { | |
|         allowSbtVerHalf = cbWidth >= 8 | |
|         allowSbtVerQuad = cbWidth >= 16 | |
|         allowSbtHorHalf = cbHeight >= 8 | |
|         allowSbtHorQuad = cbHeight >= 16 | |
|         if( allowSbtVerHalf \|\| allowSbtHorHalf \|\|<br>          allowSbtVerQuad \|\| allowSbtHorQuad ) | |
|           cu_sbt_flag[ x0 ][ y0 ] | ae(v) |
|       } | |
|       if( cu_sbt_flag[ x0 ][ y0 ] ) { | |
|         if( ( allowSbtVerHalf \|\| allowSbtHorHalf ) &&<br>          ( allowSbtVerQuad \|\| allowSbtHorQuad ) ) | |
|           cu_sbt_quad_flag[ x0 ][ y0 ] | ae(v) |
|         if( ( cu_sbt_quad_flag[ x0 ][ y0 ] && allowSbtVerQuad && allowSbtHorQuad )<br>          \|\| ( !cu_sbt_quad_flag[ x0 ][ y0 ] && allowSbtVerHalf && allowSbtHorHalf ) ) | |
|           cu_sbt_horizontal_flag[ x0 ][ y0 ] | ae(v) |
|         cu_sbt_pos_flag[ x0 ][ y0 ] | ae(v) |
|       } | |
|     } | |
|     transform_tree( x0, y0, cbWidth, cbHeight, treeType ) | |
|   } | |
| } | |

FIG. 21C

Transform_tree syntax

| transform_tree( x0, y0, tbWidth, tbHeight, treeType) { | Descriptor |
|---|---|
|   if( tbWidth > MaxTbSizeY || tbHeight > MaxTbSizeY ) { | |
|     trafoWidth = ( tbWidth > MaxTbSizeY ) ? (tbWidth / 2) : tbWidth | |
|     trafoHeight = ( tbHeight > MaxTbSizeY ) ? (tbHeight / 2) : tbHeight | |
|     transform_tree( x0, y0, trafoWidth, trafoHeight ) | |
|     if( tbWidth > MaxTbSizeY ) | |
|       transform_tree( x0 + trafoWidth, y0, trafoWidth, trafoHeight, treeType ) | |
|     if( tbHeight > MaxTbSizeY ) | |
|       transform_tree( x0, y0 + trafoHeight, trafoWidth, trafoHeight, treeType ) | |
|     if( tbWidth > MaxTbSizeY && tbHeight > MaxTbSizeY ) | |
|       transform_tree( x0 + trafoWidth, y0 + trafoHeight, trafoWidth, trafoHeight, treeType ) | |
|   } else if( cu_sbt_flag[ x0 ][ y0 ] ) | |
|     factorTb0 = cu_sbt_quad_flag[ x0 ][ y0 ] ? 1 : 2 | |
|     factorTb0 = cu_sbt_pos_flag[ x0 ][ y0 ] ? ( 4 - factorTb0 ) : factorTb0 | |
|     noResiTb0 = cu_sbt_pos_flag[ x0 ][ y0 ] ? 1 : 0 | |
|     if( !cu_sbt_horizontal_flag[ x0 ][ y0 ] ) { | |
|       trafoWidth = tbWidth * factorTb0 / 4 | |
|       transform_tree( x0, y0, trafoWidth, tbHeight, treeType , noResiTb0 ) | |
|       transform_tree( x0 + trafoWidth, y0, tbWidth - trafoWidth, tbHeight, treeType , !noResiTb0 ) | |
|     } | |
|     else { | |
|       trafoHeight = tbHeight * factorTb0 / 4 | |
|       transform_tree( x0, y0, tbWidth, trafoHeight, treeType , noResiTb0 ) | |
|       transform_tree( x0, y0 + trafoHeight, tbWidth, tbHeight - trafoHeight, treeType , !noResiTb0 ) | |
|     } | |
|   } else { | |
|     transform_unit( x0, y0, tbWidth, tbHeight, treeType, 0 ) | |
|   } | |
| } | |

FIG. 21D  2104

Transform unit syntax

| | Descriptor |
|---|---|
| transform_unit(x0, y0, tbWidth, tbHeight, treeType, noResi ) { | |
|   if( ( treeType == SINGLE_TREE \|\| treeType == DUAL_TREE_LUMA && !noResi ) | |
|     tu_cbf_luma[ x0 ][ y0 ] | ae(v) |
|   if( ( treeType == SINGLE_TREE \|\| treeType == DUAL_TREE_CHROMA ) &&!noResi ) { | |
|     tu_cbf_cb[ x0 ][ y0 ] | ae(v) |
|     tu_cbf_cr[ x0 ][ y0 ] | ae(v) |
|   } | |
|   if( ( ( CuPredMode[ x0 ][ y0 ] == MODE_INTRA ) && sps_mts_intra_enabled_flag) \|\| <br>     ( ( CuPredMode[ x0 ][ y0 ] == MODE_INTER ) && sps_mts_inter_enabled_flag)) <br>     && tu_cbf_luma[x0 ][ y0 ] && treeType != DUAL_TREE_CHROMA <br>     && ( tbWidth <= 32 ) && ( tbHeight <= 32 ) && !cu_sbt_flag[ x0 ][ y0 ]) | |
|     cu_mts_flag[ x0 ][ y0 ] | ae(v) |
|   if( tu_cbf_luma[ x0 ][ y0 ] ) | |
|     residual_coding(x0, y0, log2( tbWidth ), log2( tbHeight ), 0 ) | |
|   if( tu_cbf_cb[ x0 ][ y0 ] ) | |
|     residual_coding( x0, y0, log2( tbWidth / 2 ), log2( tbHeight / 2 ), 1 ) | |
|   if( tu_cbf_cr[ x0 ][ y0 ] ) | |
|     residual_coding( x0, y0, log2( tbWidth / 2 ), log2( tbHeight / 2 ), 2 ) | |
| } | |

Sequence parameter set RBSP semantics sps_sbt_enabled_flag equal to 0 specifies that sub-block transform for inter-predicted CU is disabled. sps_sbt_enabled_flag equal to 1 specifies that sub-block transform for inter-predicted CU is enabled. — 2108

General slice header semantics slice_sbt_max_size_64_flag equal to 0 specifies that the maximum CU width and height for allowing sub-block transform is 32. slice_sbt_max_size_64_flag equal to 1 specifies that the maximum CU width and height for allowing sub-block transform is 64. — 2109 maxSbtSize = slice_sbt_max_size_64_flag ? 64 : 32

*FIG. 21F*

Coding unit semantics cu_sbt_flag[ x0 ][ y0 ] equal to 1 specifies that for the current coding unit, sub-block transform is used. cu_sbt_flag[ x0 ][ y0 ] equal to 0 specifies that for the current coding unit, the sub-block transform is not used.

When cu_sbt_flag[ x0 ][ y0 ] is not present, its value is inferred to be equal to 0.

NOTE – : When sub-block transform is used, a coding unit is tiled into two transform units, one transform unit has residual, the other does not have residual.

cu_sbt_quad_flag[ x0 ][ y0 ] equal to 1 specifies that for the current coding unit, the sub-block transform include a transform unit of 1/4 size of the current coding unit. cu_sbt_quad_flag[ x0 ][ y0 ] equal to 0 specifies that for the current coding unit the sub-block transform include a transform unit of 1/2 size of the current coding unit.

When cu_sbt_quad_flag[ x0 ][ y0 ] is not present, its value is inferred to be equal to 0.

cu_sbt_horizontal_flag[ x0 ][ y0 ] equal to 1 specifies that the current coding unit is tiled into 2 transform units by a horizontal split. cu_sbt_horizontal_flag[ x0 ][ y0 ] equal to 0 specifies that the current coding unit is tiled into 2 transform units by a vertical split.

When cu_sbt_horizontal_flag[ x0 ][ y0 ] is not present, its value is derived as follows:

- If cu_sbt_quad_flag[ x0 ][ y0 ] is equal to 1, cu_sbt_horizontal_flag[ x0 ][ y0 ] is set to be equal to allowSbtHoriQuad.
- Otherwise (cu_sbt_quad_flag[ x0 ][ y0 ] is equal to 0), cu_sbt_horizontal_flag[ x0 ][ y0 ] is set to be equal to allowSbtHoriHalf.

cu_sbt_pos_flag[ x0 ][ y0 ] equal to 1 specifies that the tu_cbf_luma, tu_cbf_cb and tu_cbf_cr of the first transform unit in the current coding unit are not present in the bitstream. cu_sbt_pos_flag[ x0 ][ y0 ] equal to 0 specifies that the tu_cbf_luma, tu_cbf_cb and tu_cbf_cr of the second transform unit in the current coding unit are not present in the bitstream.

FIG. 21G  2110

Transformation process for scaled transform coefficients

General

Inputs to this process are:

- a luma location ( xTbY, yTbY ) specifying the top-left sample of the current luma transform block relative to the top-left luma sample of the current picture.
- a variable nTbW specifying the width of the current transform block.
- a variable nTbH specifying the height of the current transform block.
- a variable cIdx specifying the colour component of the current block.
- an (nTbW)x(nTbH) array d[ x ][ y ] of scaled transform coefficients with x = 0..nTbW − 1, y = 0..nTbH − 1.

Output of this process is the (nTbW)x(nTbH) array r[ x ][ y ] of residual samples with x = 0..nTbW − 1, y = 0..nTbH − 1.

2112 — If cu_sbt_flag[ xTbY ][ yTbY ] is equal to 1, the variable trTypeHor specifying the horizontal transform kernel and the variable trTypeVer specifying the vertical transform kernel are derived in Table 8-X depending on cu_sbt_horizontal_flag[ xTbY ][ yTbY ] and cu_sbt_pos_flag[ xTbY ][ yTbY ].

Otherwise (cu_sbt_flag[ xTbY ][ yTbY ] is equal to 0), the variable trTypeHor specifying the horizontal transform kernel and the variable trTypeVer specifying the vertical transform kernel are derived in Table 8-9 depending on mts_idx[ xTbY ][ yTbY ] and CuPredMode[ xTbY ][ yTbY ].

The (nTbW)x(nTbH) array r of residual samples is derived as follows:

1. Each (vertical) column of scaled transform coefficients d[ x ][ y ] with x = 0..nTbW − 1, y = 0..nTbH − 1 is transformed to e[ x ][ y ] with x = 0..nTbW − 1, y = 0..nTbH − 1 by invoking the one-dimensional transformation process for each column x = 0..nTbW − 1 with the height of the transform block nTbH, the list d[ x ][ y ] with y = 0..nTbH − 1 and the transform type variable trType set equal to trTypeVer as inputs, and the output is the list e[ x ][ y ] with y = 0..nTbH − 1.

2. The intermediate sample values g[ x ][ y ] with x = 0..nTbW − 1, y = 0..nTbH − 1 are derived as follows:

g[ x ][ y ] = Clip3( CoeffMin, CoeffMax, ( e[ x ][ y ] + 256 ) >> 9 )

FIG. 21H

Continue from FIG. 21H

3. Each (horizontal) row of the resulting array g[ x ][ y ] with x = 0..nTbW − 1, y = 0..nTbH − 1 is transformed to r[ x ][ y ] with x = 0..nTbW − 1, y = 0..nTbH − 1 by invoking the one-dimensional transformation process for each row y = 0..nTbH − 1 with the width of the transform block nTbW, the list g[ x ][ y ] with x = 0..nTbW − 1 and the transform type variable trType set equal to trTypeHor as inputs, and the output is the list r[ x ][ y ] with x = 0..nTbW − 1.

Table 8-X – Specification of trTypeHor and trTypeVer depending on mts_idx[ x ][ y ] and CuPredMode[ x ][ y ]

|  | cu_sbt_horizontal_flag [ xTbY ][ yTbY ] == 0 | | cu_sbt_horizontal_flag [ xTbY ][ yTbY ] == 1 | |
|---|---|---|---|---|
|  | cu_sbt_pos_flag [ xTbY ][ yTbY ] == 0 | cu_sbt_pos_flag [ xTbY ][ yTbY ] == 1 | cu_sbt_pos_flag [ xTbY ][ yTbY ] == 0 | cu_sbt_pos_flag [ xTbY ][ yTbY ] == 1 |
| trTypeHor | 2 | 1 | nTbW > 32 ? 0 : 1 | nTbW > 32 ? 0 : 1 |
| trTypeVer | nTbH > 32 ? 0 : 1 | nTbH > 32 ? 0 : 1 | 2 | 1 |

— 2113

Table 8-9 – Specification of trTypeHor and trTypeVer depending on mts_idx[ x ][ y ] and CuPredMode[ x ][ y ]

| mts_idx[ xTbY ][ yTbY ] | CuPredMode[ xTbY ][ yTbY ] == MODE_INTRA | | CuPredMode[ xTbY ][ xTbY ] == MODE_INTER | |
|---|---|---|---|---|
|  | trTypeHor | trTypeVer | trTypeHor | trTypeVer |
| −1 (inferred) | 0 | 0 | 0 | 0 |
| 0 (00) | 1 | 1 | 2 | 2 |
| 1 (01) | 2 | 1 | 1 | 2 |
| 2 (10) | 1 | 2 | 2 | 1 |
| 3 (11) | 2 | 2 | 1 | 1 |

FIG. 21I

| | Descriptor |
|---|---|
| transform_tree( x0, y0, tbWidth, tbHeight , treeType) { | |
|   InferTuCbfLuma = 1 | |
|   if( IntraSubPartSplitType == NO_ISP_SPLIT ) { | |
|     MaxSbSizeY = ( tbWidth > 64 \|\| tbHeight > 64 ) ? 64 : MaxTbSizeY | |
|     if( tbWidth > MaxSbSizeY \|\| tbHeight > MaxSbSizeY ) { | |
|       trafoWidth = ( tbWidth > MaxSbSizeY ) ? (tbWidth / 2) : tbWidth | |
|       trafoHeight = ( tbHeight > MaxSbSizeY ) ? (tbHeight / 2) : tbHeight | |
|       transform_tree( x0, y0, trafoWidth, trafoHeight ) | |
|       if( tbWidth > MaxSbSizeY ) | |
|         transform_tree( x0 + trafoWidth, y0, trafoWidth, trafoHeight, treeType ) | |
|       if( tbHeight > MaxSbSizeY ) | |
|         transform_tree( x0, y0 + trafoHeight, trafoWidth, trafoHeight, treeType ) | |
|       if( tbWidth > MaxSbSizeY && tbHeight > MaxSbSizeY ) | |
|         transform_tree( x0 + trafoWidth, y0 + trafoHeight, trafoWidth, trafoHeight, treeType ) | |
|     } else { | |
|       transform_unit( x0, y0, tbWidth, tbHeight, treeType, 0 ) | |
|     } | |
|   } else if( cu_sbt_flag ) { | |
|     if( !cu_sbt_horizontal_flag ) { | |
|       trafoWidth = tbWidth * SbtNumFourthsTb0 / 4 | |
|       transform_unit( x0, y0, trafoWidth, tbHeight, treeType , 0 ) | |
|       transform_unit( x0 + trafoWidth, y0, tbWidth - trafoWidth , tbHeight, treeType , 1 ) | |
|     } else { | |
|       trafoHeight = tbHeight * SbtNumFourthsTb0 / 4 | |
|       transform_unit( x0, y0, tbWidth, trafoHeight, treeType , 0 ) | |
|       transform_unit( x0, y0 + trafoHeight, tbWidth, tbHeight - trafoHeight, treeType , 1 ) | |
|     } | |
|   } else if( IntraSubPartitionsSplitType == ISP_HOR_SPLIT ) { | |
|     trafoHeight = tbHeight / NumIntraSubPartitions | |
|     for( partIdx = 0; partIdx < NumIntraSubPartitions; partIdx++ ) | |
|       transform_unit( x0, y0 + trafoHeight * partIdx, tbWidth, trafoHeight, treeType, partIdx ) | |
|   } else if( IntraSubPartitionsSplitType == ISP_VER_SPLIT ) { | |
|     trafoWidth = tbWidth / NumIntraSubPartitions | |
|     for( partIdx = 0; partIdx < NumIntraSubPartitions; partIdx++ ) | |
|       transform_unit( x0 + trafoWidth * partIdx, y0, trafoWidth, tbHeight, treeType, partIdx ) | |
|   } | |
| } | |

FIG. 24

METHOD AND APPARATUS FOR VIDEO CODING

INCORPORATION BY REFERENCE

This present application claims the benefit of priority to U.S. Provisional Application No. 62/822,787, "Modified VPDU Compatible Max Transform Control" filed on Mar. 22, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEMNVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry is configured to decode coded information of a coding block (CB) in a picture from a coded video bitstream. The coded information indicates a width of W samples and a height of H samples of the CB. The processing circuitry can partition the CB into sub-processing units (SPUs) having a width that is a minimum one of W and K and a height that is a minimum one of H and K. At least one of the width W and the height H of the CB is larger than a processing data unit size K. The processing circuitry can determine a partitioning structure to further partition the SPUs based on the width and the height of the SPUs and a maximum transform unit (TU) size of M samples. At least one of the width and the height of the SPUs is larger than M. The processing circuitry can partition each of the SPUs into TUs of M×M based on the determined partitioning structure.

In an embodiment, the width and the height of the SPUs are larger than M. The processing circuitry can determine the partitioning structure to be a quadtree partitioning structure. The processing circuitry can partition the SPUs into the TUs based on the quadtree partitioning structure.

In an embodiment, the width of the SPUs is larger than M and the height of the SPUs is equal to M. The processing circuitry can determine the partitioning structure to be a vertical binary tree partitioning structure. The processing circuitry can partition the SPUs into the TUs based on the vertical binary tree partitioning structure.

In an embodiment, the height of the SPUs is larger than M and the width of the SPUs is equal to M. The processing circuitry can determine the partitioning structure to be a horizontal binary tree partitioning structure. The processing circuitry can partition the SPUs into the TUs based on the horizontal binary tree partitioning structure.

In an embodiment, the processing circuitry can partition one of the SPUs recursively into the TUs based on the partitioning structure.

In an embodiment, the processing circuitry can process the SPUs according to a first scan order, and process the TUs in each of the SPUs according to a second scan order. In an example, at least one of the first scan order and the second scan order is one of (i) a raster scan order, (ii) a vertical scan order, (iii) a zig-zag order, and (iv) a diagonal scan order. In an example, the first scan order and the second scan order are the raster scan order. In an example, W is 128, H is 64, K is 64, and M is 32. The first scan order is from left to right and the second scan order is a raster scan order.

In an embodiment, the processing data unit size K indicates a size of a virtual pipeline data unit (VPDU). A first one of the SPUs is included in a first VPDU and a second one of the SPUs is included in a second VPDU in the picture. After processing the first VPDU in a first stage of a multi-stage pipeline, the processing circuitry can simultaneously process the first VPDU in a second stage of the multi-stage pipeline and the second VPDU in the first stage.

BRIEF DESCRIPTION OF THE DRAWINGS

Further features, the nature, and various advantages of the disclosed subject matter will be more apparent from the following detailed description and the accompanying drawings in which:

Figures 10A, 10B:
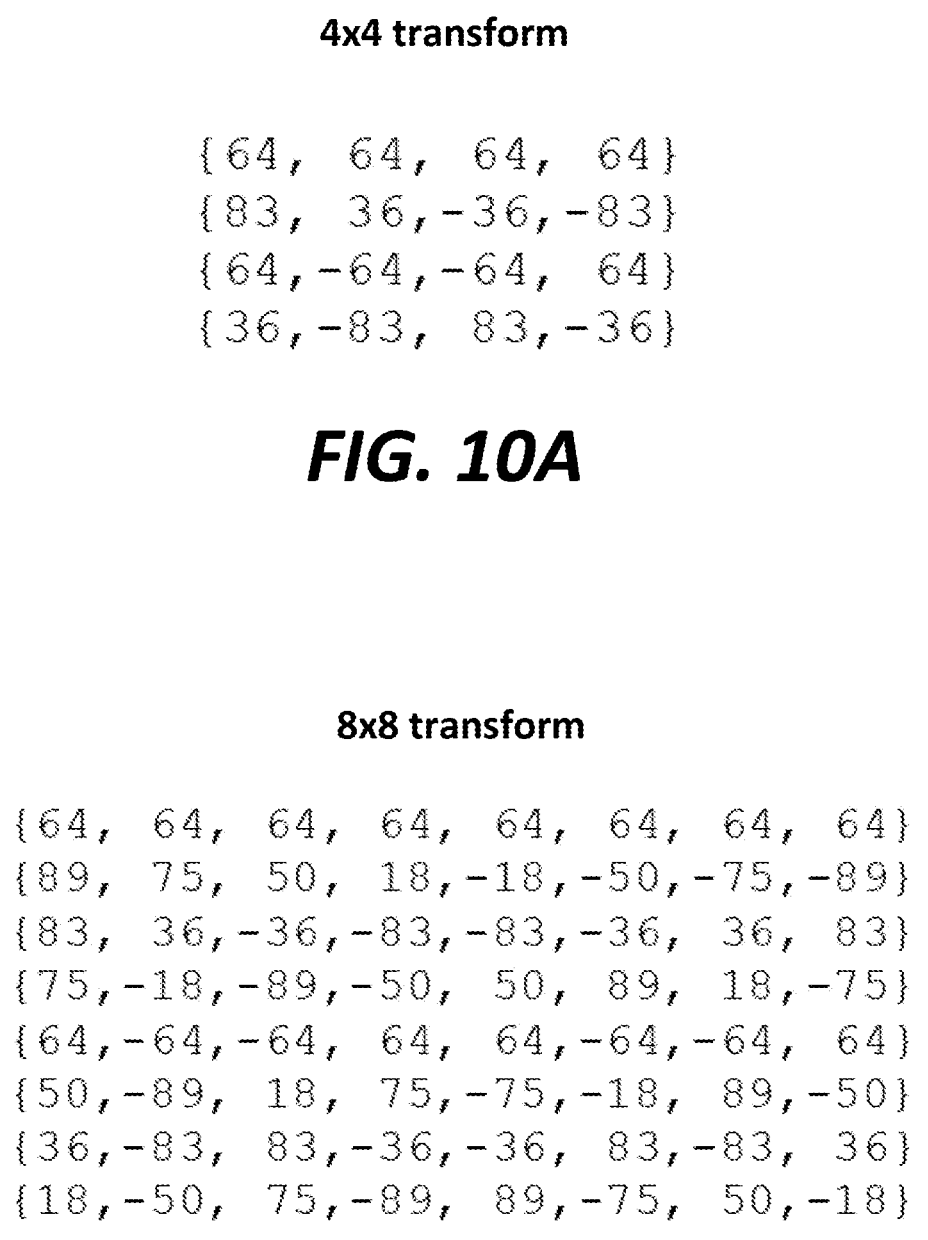
Figure 10C:
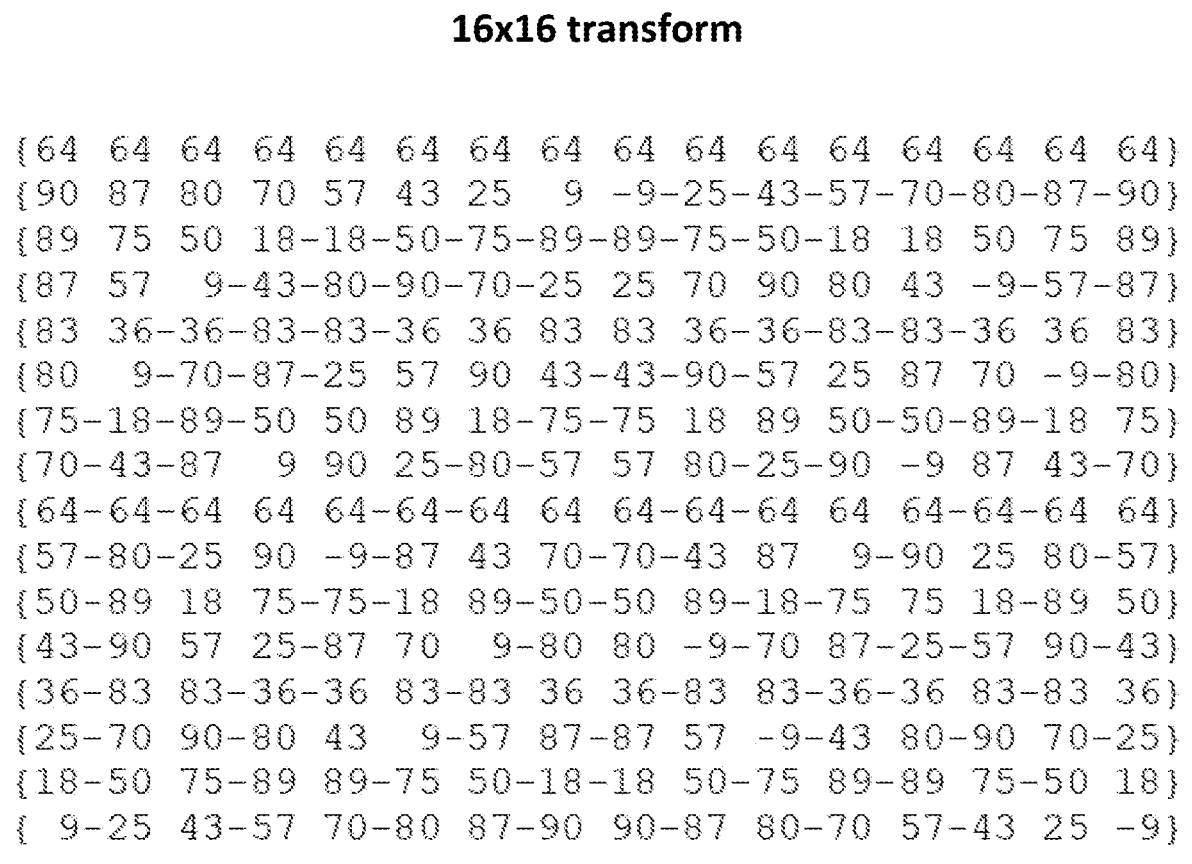
Figure 10D:
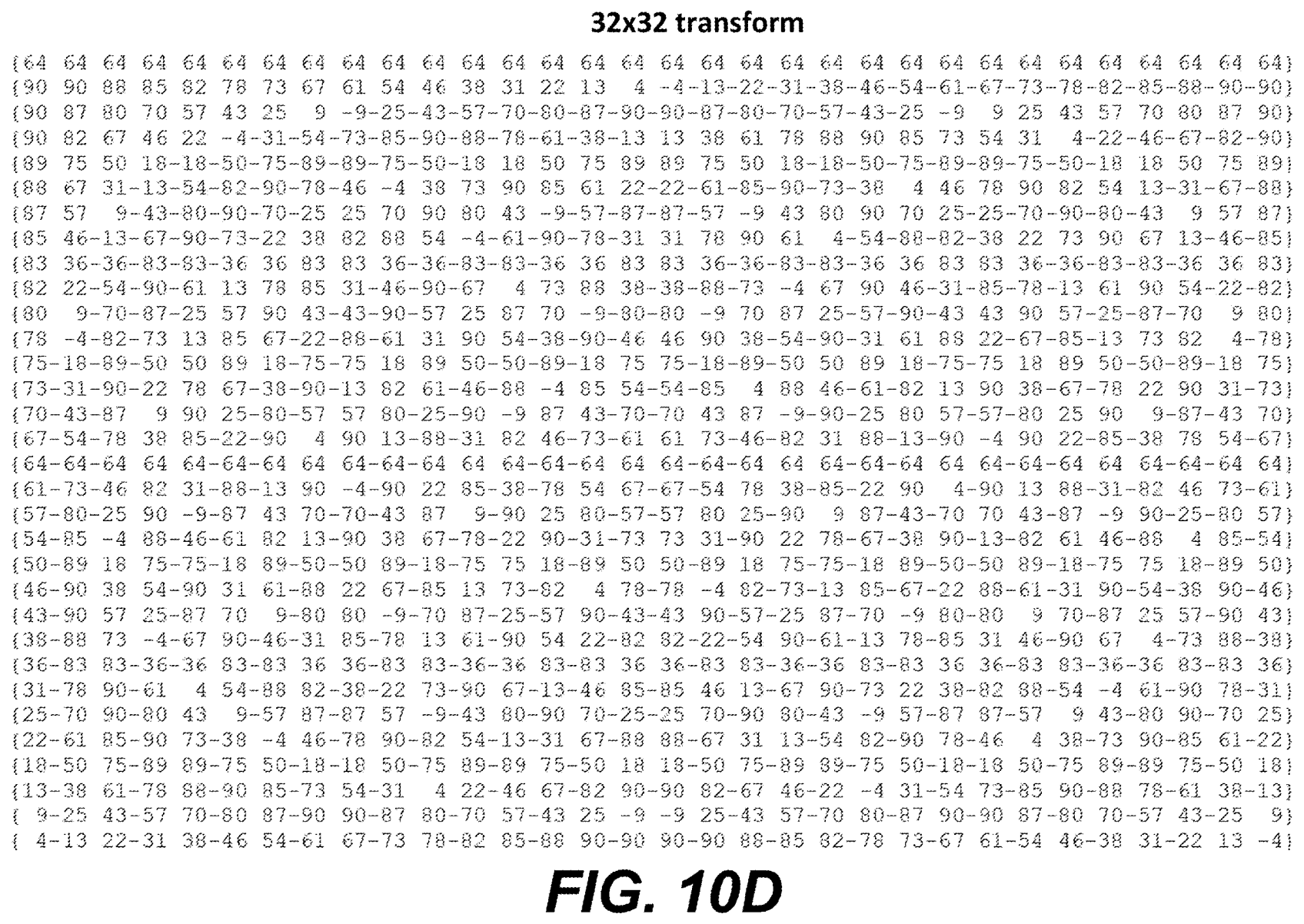

FIGS. 10A-10D show transform core matrices of 4-point, 8-point, 16-point and 32-point DCT-2 transform, respectively.

Figure 11C:
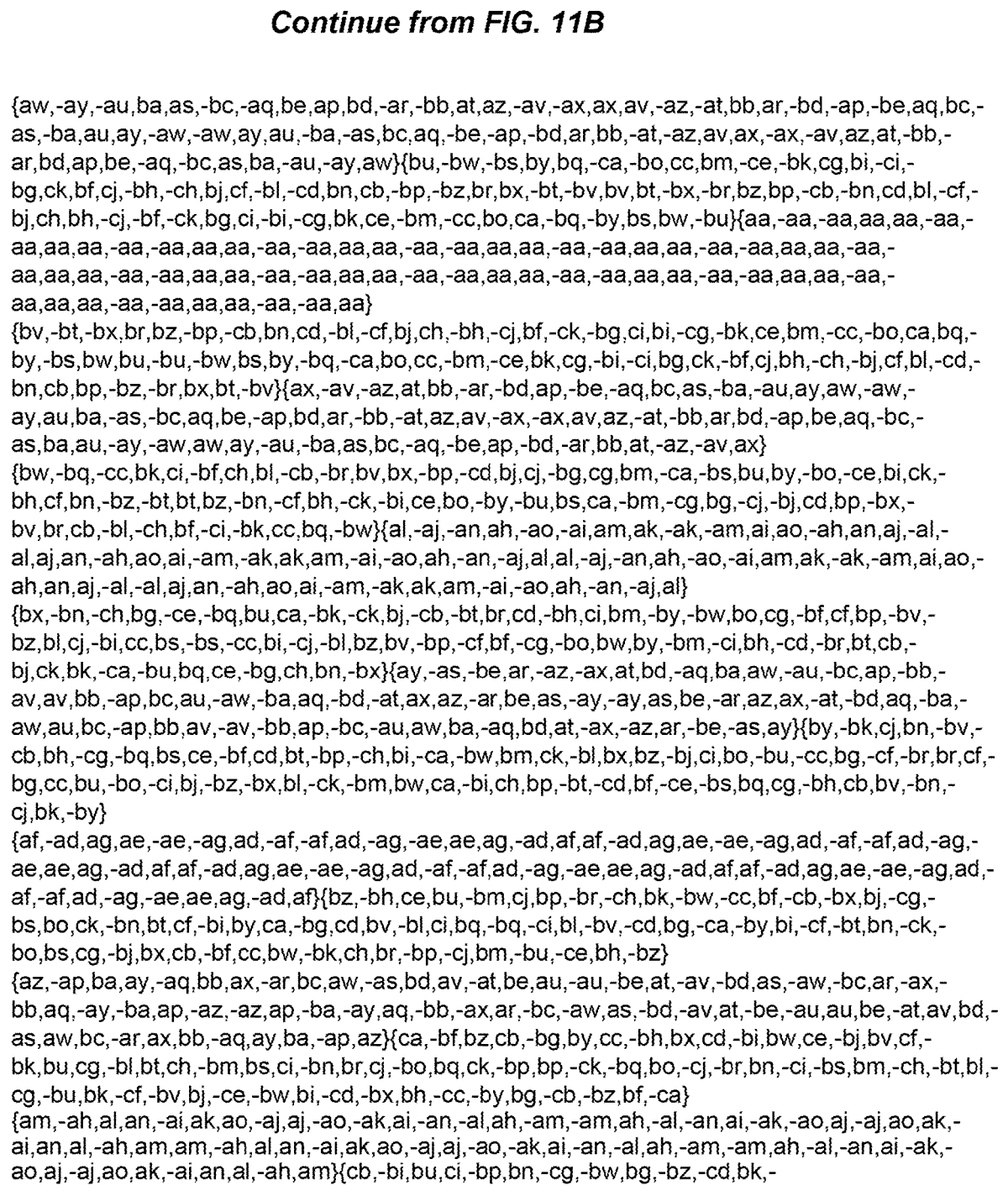

FIGS. 11A-11E show a 64×64 transform core matrix of the 64-point DCT-2 transform.

FIG. 12 shows transform basis functions of the selected discrete sine transform (DST)/discrete cosine transform (DCT) transforms of an adaptive multiple transform (AMT).

FIG. 13 shows a table (1300) illustrating a mapping relationship between an mts_idx value and respective horizontal or vertical transforms.

FIGS. 14A-14D show transform core matrices of DST-7 transform.

FIGS. 15A-15D show transform core matrices of DCT-8 transform.

FIG. 16 shows a number of sub-partitions depending on a block size.

FIGS. 19A-19B show an example of syntax elements (1900) for an ISP coding mode.

FIGS. 21A-21I show an example of a specification text of a video coding standard when SBT is used.

FIG. 24 shows an example of transform tree syntax.

DETAILED DESCRIPTION OF EMBODIMENTS

I. Video Coding Encoder and Decoder

Figure 1A:
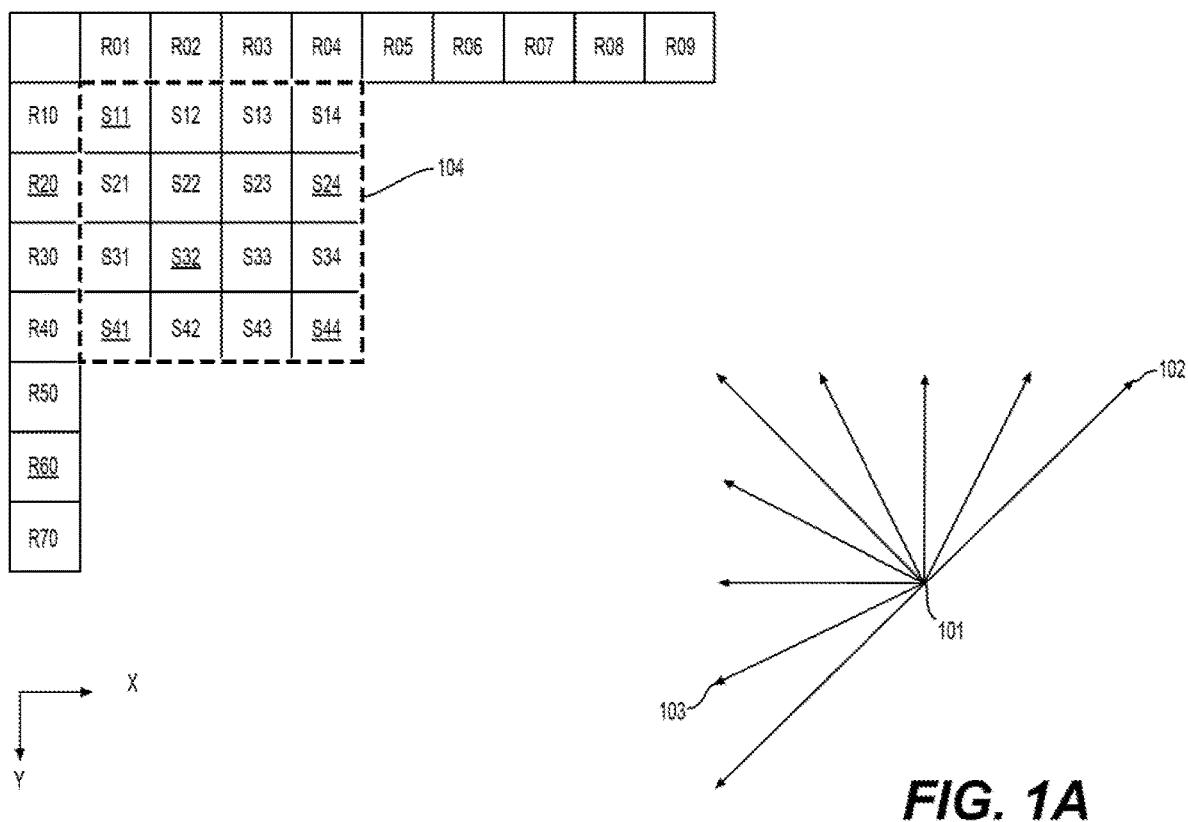
FIG. 1A is a schematic illustration of an exemplary subset of intra prediction modes.
Figure 1B:
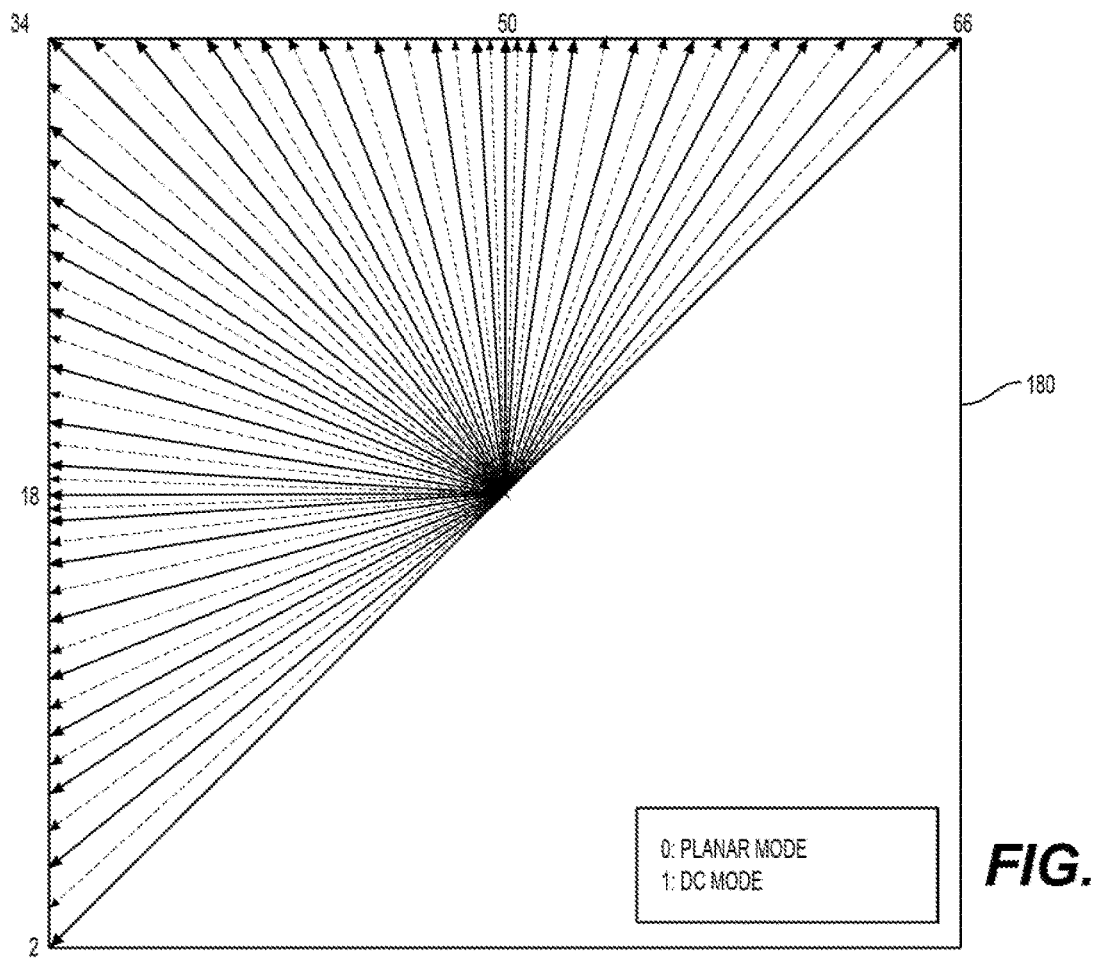
FIG. 1B is an illustration of exemplary intra prediction directions.
Figure 2:
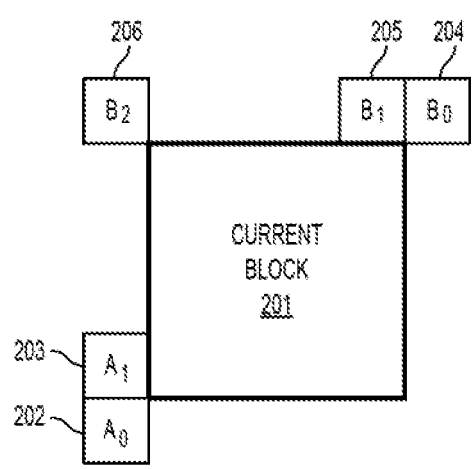
FIG. 2 is a schematic illustration of a current block and its surrounding spatial merge candidates in one example.
Figure 3:
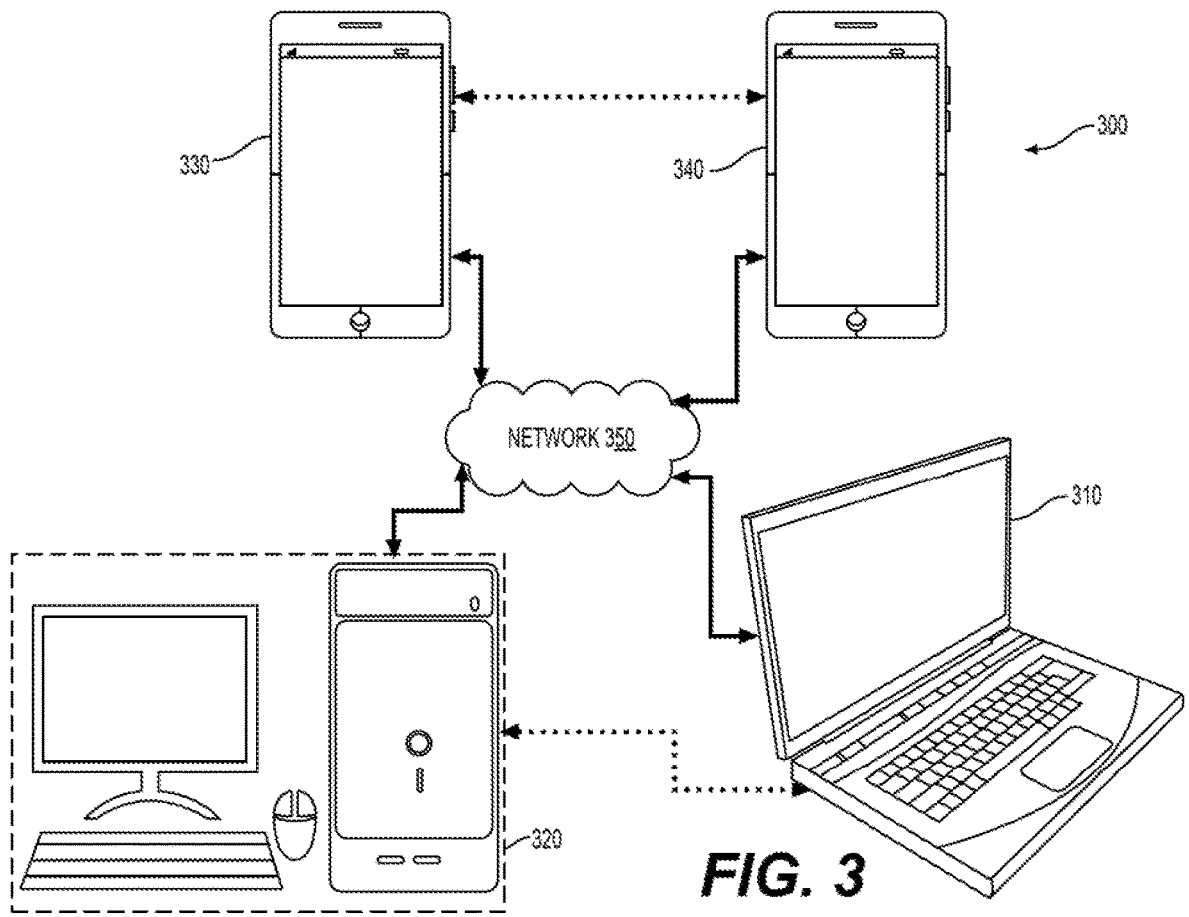
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
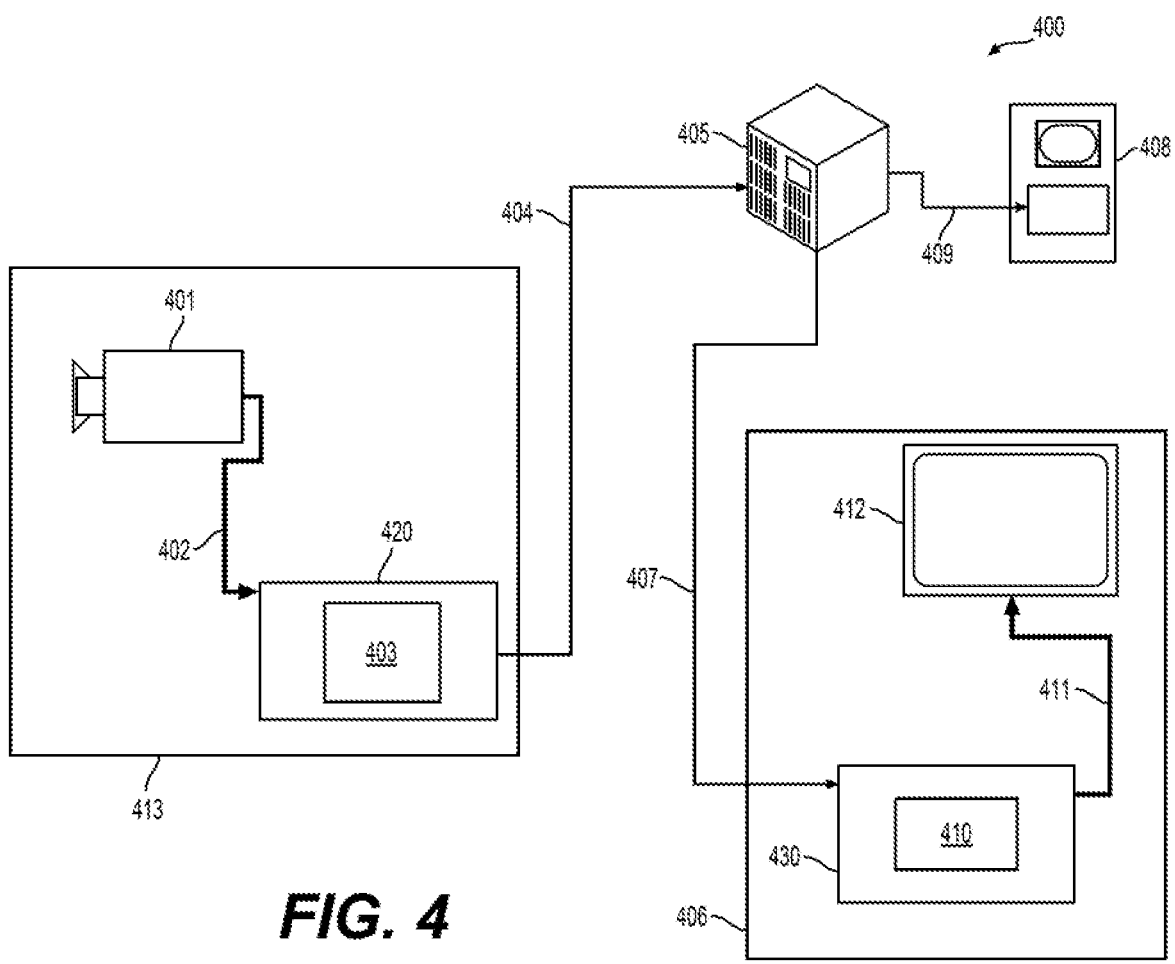
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
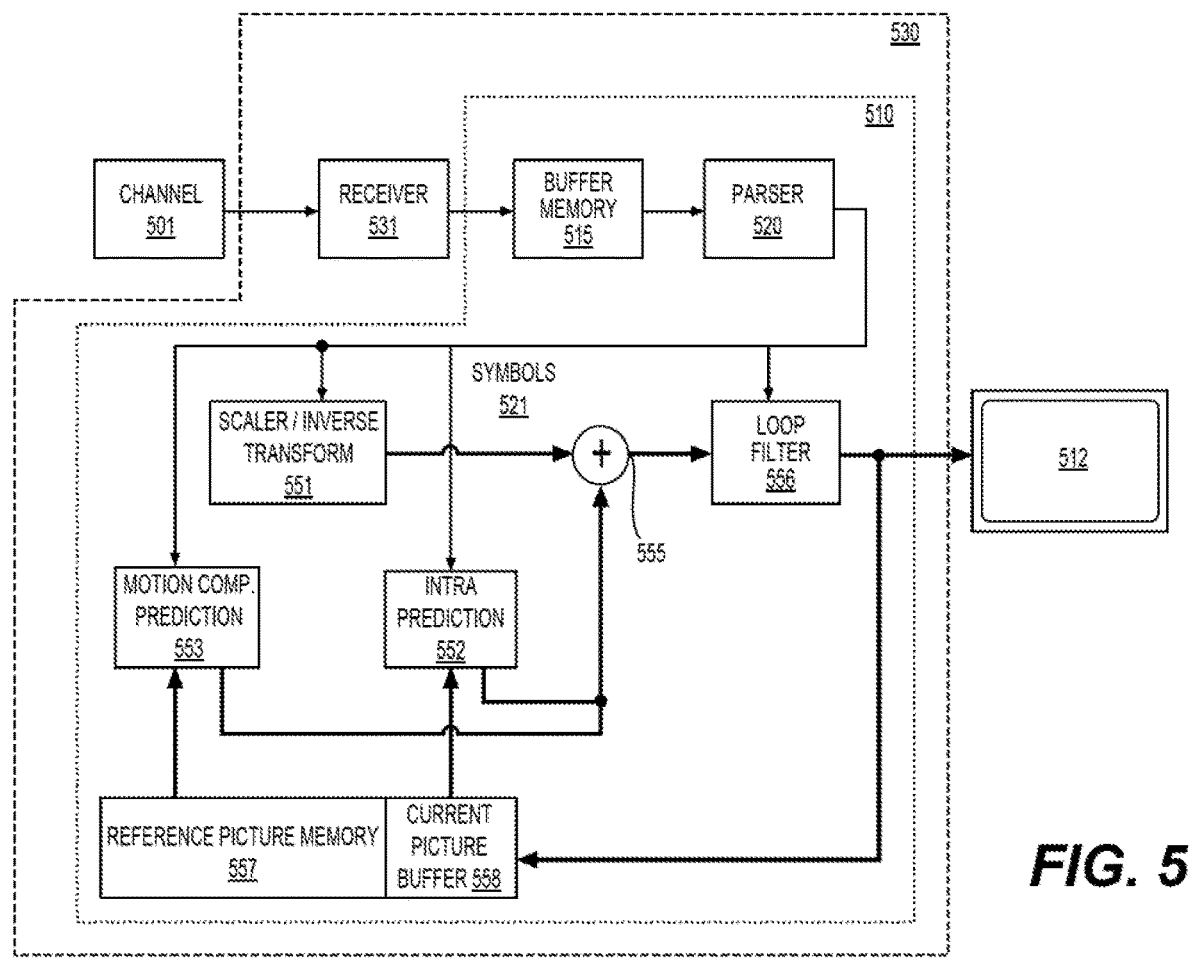
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
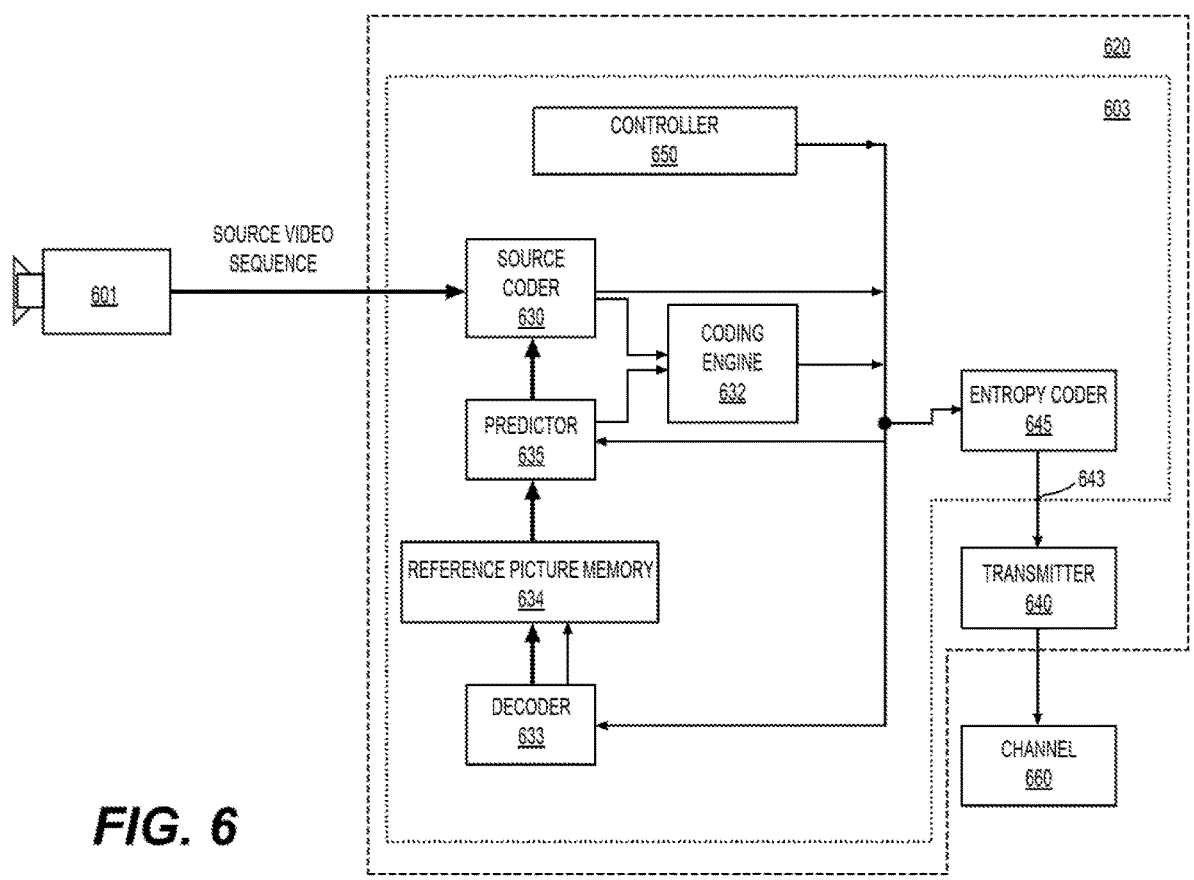
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by losslessly compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
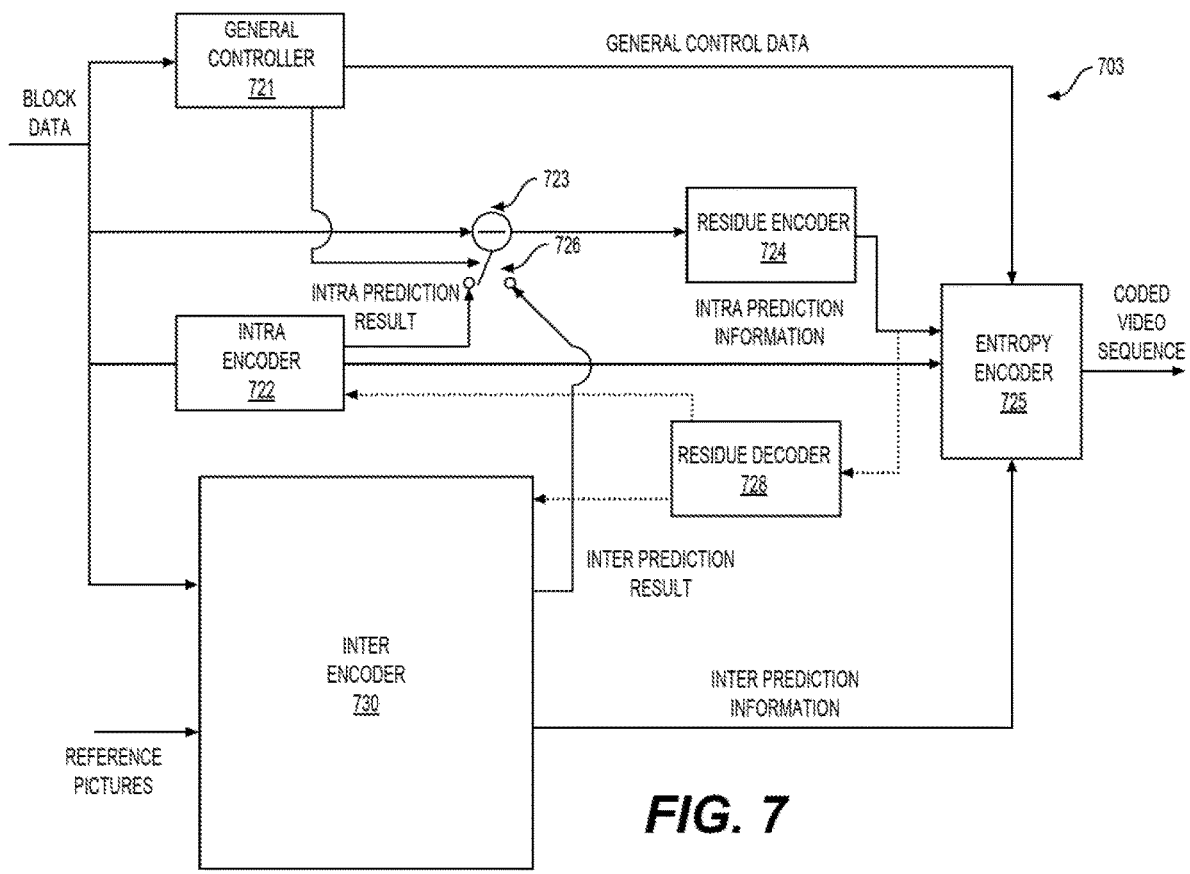
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
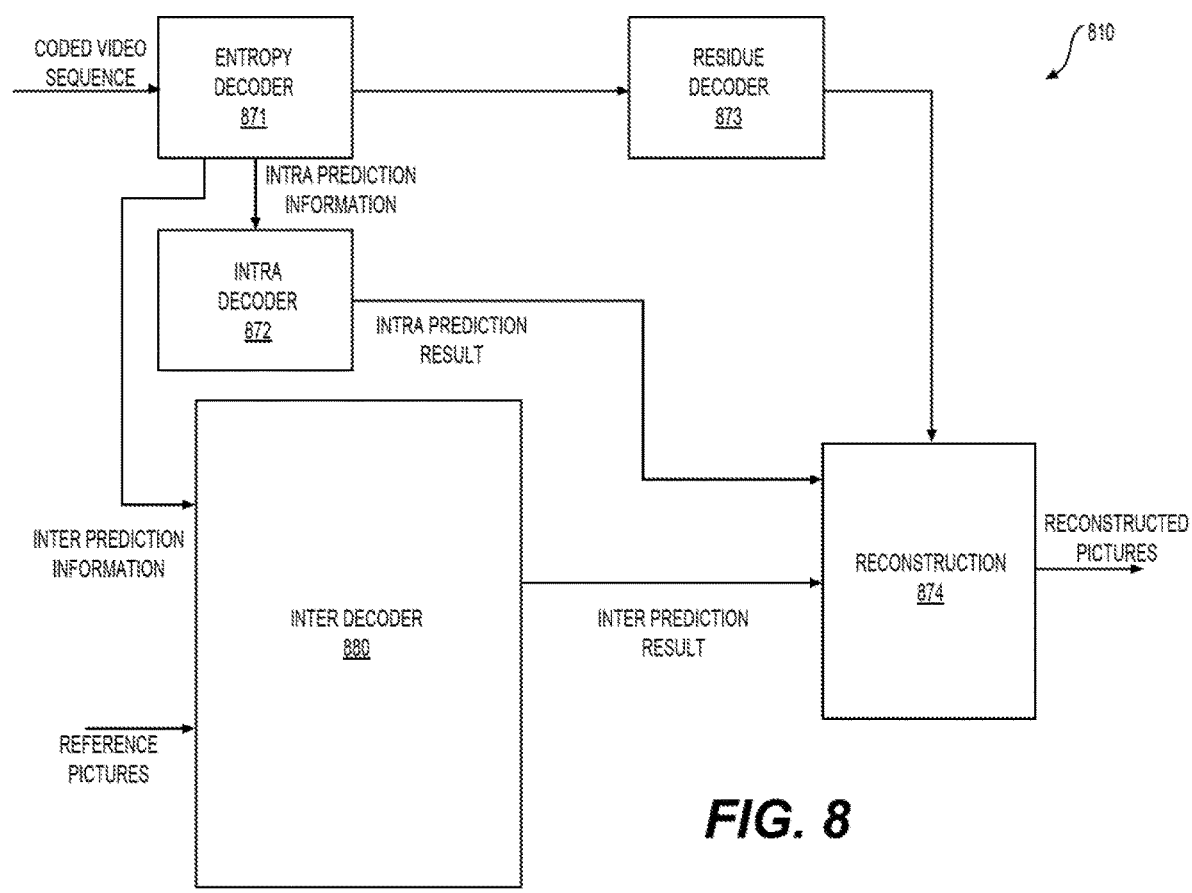
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

II. Transform Processing Techniques

1. Block Partitioning Structure Including a Quadtree Partitioning Structure

A block partitioning structure can be referred to as a coding tree. In some embodiments, by using a quadtree structure, a coding tree unit (CTU) is split into coding units (CUs) to adapt to various local characteristics. A decision on whether to code a picture area using an inter-picture (temporal) or intra-picture (spatial) prediction is made at CU level. Each CU can be further split into one, two, or four prediction units (PUs) according to a PU splitting type. Inside one PU, a same prediction process is applied and relevant information is transmitted to a decoder on a PU basis.

After obtaining a residual block by applying a prediction process based on the PU splitting type, a CU can be partitioned into transform units (TUs) according to another quadtree structure. As can be seen, there are multiple partition conceptions including CU, PU, and TU. In some embodiments, a CU or a TU can only be square shape, while a PU may be square or rectangular shape. In some embodiments, one coding block may be further split into four square sub-blocks, and transform is performed on each sub-block, i.e., TU. Each TU can be further split recursively into smaller Tus using a quadtree structure which is called residual quadtree (RQT).

At a picture boundary, in some embodiments, implicit quadtree split can be employed so that a block will keep quad-tree splitting until the size fits the picture boundary.

2. Quadtree Plus Binary Tree (QTBT) Block Partitioning Structure

In some embodiments, a quadtree plus binary tree (QTBT) structure is employed. The QTBT structure removes the concepts of multiple partition types (the CU, PU and TU concepts), and supports more flexibility for CU partition shapes. In the QTBT block structure, a CU can have either a square or rectangular shape.

Figure 9A:
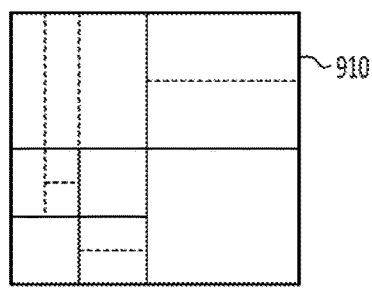
FIG. 9A shows a CTU that is partitioned with a quadtree plus binary tree (QTBT) structure (910).
Figure 9B:
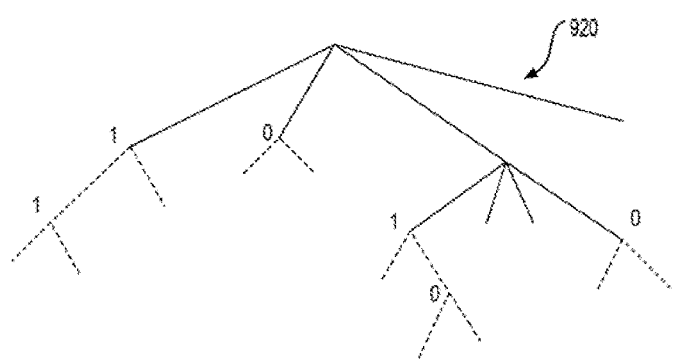
FIG. 9B shows the QTBT structure (920).

FIG. 9A shows a CTU (910) that is partitioned by using a QTBT structure (920) shown in FIG. 9B. The CTU (910) is first partitioned by a quadtree structure. The quadtree leaf nodes are further partitioned by a binary tree structure or a quadtree structure. There can be two splitting types, symmetric horizontal splitting and symmetric vertical splitting, in the binary tree splitting. The binary tree leaf nodes are called CUs that can be used for prediction and transform processing without any further partitioning. Accordingly, CU, PU and TU have the same block size in the QTBT coding block structure.

In some embodiments, a CU can include coding blocks (CBs) of different color components. For example, one CU contains one luma CB and two chroma CBs in the case of P and B slices of the 4:2:0 chroma format. A CU can include a CB of a single color component. For example, one CU contains only one luma CB or just two chroma CBs in the case of I slices.

The following parameters are defined for the QTBT partitioning scheme in some embodiments:
  CTU size: the root node size of a quadtree, e.g. the same concept as in HEVC.
  MinQTSize: the minimum allowed quadtree leaf node size.
  MaxBTSize: the maximum allowed binary tree root node size.
  MaxBTDepth: the maximum allowed binary tree depth.
  MinBTSize: the minimum allowed binary tree leaf node size.

In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0.

When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In an embodiment, a maximum CTU size is 256×256 luma samples.

In FIGS. 9A and 9B, the solid lines indicate quadtree splitting and dotted lines indicate binary tree splitting. In each splitting (i.e., non-leaf) node of the binary tree, one flag is signaled to indicate which splitting type (i.e., horizontal or vertical) is used. For example, 0 indicates a horizontal splitting and 1 indicates a vertical splitting. For the quadtree splitting, there is no need to indicate the splitting type since quadtree splitting always splits a block both horizontally and vertically to produce 4 sub-blocks with an equal size.

In some embodiments, the QTBT scheme supports the flexibility for the luma and chroma to have a separate QTBT structure. For example, for P and B slices, the luma and chroma blocks in one CTU share the same QTBT structure. However, for I slices, the luma CTB is partitioned into CUs by a QTBT structure, and the chroma blocks are partitioned into chroma CUs by another QTBT structure. Thus, a CU in an I slice consists of a coding block of the luma component or coding blocks of two chroma components, and a CU in a P or B slice consists of coding blocks of all three color components.

In some embodiments, inter prediction for small blocks is restricted to reduce memory access of motion compensation. For example, bi-prediction is not supported for 4×8 and 8×4 blocks, and inter prediction is not supported for 4×4 blocks.

3. Ternary Tree (TT) Block Partitioning Structure

Figure 9C:
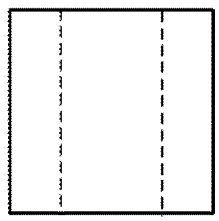
FIG. 9C shows a horizontal center-side triple-tree.
Figure 9D:
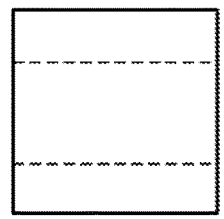
FIG. 9D shows a vertical center-side triple-tree.

In some embodiments, a multi-type-tree (MTT) structure is used for partitioning a picture. The MTT structure is a more flexible tree structure than the QTBT structure. In MTT, in addition to quad-tree and binary-tree, horizontal center-side triple-tree and vertical center-side triple-tree as shown in FIG. 9C and FIG. 9D, respectively, are employed. Triple tree partitioning can complement quad-tree and binary-tree partitioning. For example, triple-tree partitioning is able to capture objects which locate in a block center, while quad-tree and binary-tree can split crossing block centers. The width and height of partitions by triple trees are a power of 2 so that no additional transform partition is needed.

In an example, the design of a two-level tree is mainly motivated by complexity reduction. For example, the complexity of traversing of a tree is $T^D$, where T denotes a number of split types, and D is a depth of tree.

4. Primary Transform Examples

In some embodiments, such as in HEVC, 4-point, 8-point, 16-point and 32-point DCT-2 transforms are used as primary transforms. FIGS. 10A-10D show transform core matrices of 4-point, 8-point, 16-point, and 32-point DCT-2, respectively. Elements of those transform core matrices can be represented using 8-bit integers, and thus those transform core matrices are referred to as 8-bit transform cores. As shown, the transform core matrix of a smaller DCT-2 is a part of that of a larger DCT-2.

The DCT-2 core matrices show symmetry/anti-symmetry characteristics. Accordingly, a so-called "partial butterfly" implementation can be supported to reduce the number of operation counts (multiplications, adds/subs, shifts). Identical results of matrix multiplication can be obtained using the partial butterfly implementation.

5. Additional Primary Transform Examples

In some embodiments, in addition to 4-point, 8-point, 16-point and 32-point DCT-2 transforms described above, additional 2-point and 64-point DCT-2 are used. FIGS. 11A-11E shows a 64×64 transform core matrix of the 64-point DCT-2 transform.

In some embodiments, in addition to DCT-2 and 4×4 DST-7 transforms, an adaptive multiple transform (AMT) (also known as enhanced multiple transform (EMT), or multiple transform selection (MTS)) is used for residual coding of both inter and intra coded blocks. The AMT uses multiple selected transforms from discrete cosine transform (DCT)/discrete sine transform (DST) families in addition to DCT-2 transforms, such as transform core matrices of DST-7, or DCT-8 transform. FIG. 12 shows transform basis functions of the selected DST/DCT transforms.

In some embodiments, the DST/DCT transform core matrices used in AMT are represented with 8-bit representation. In some embodiments, AMT is applied to CUs with both width and height smaller than or equal to 32. Whether to apply AMT or not can be controlled by a flag (e.g., an mts flag). For example, when the mts flag is equal to 0, only DCT-2 is applied to coding a residue block. When the mts flag is equal to 1, an index (e.g., an mts_idx), can further be signaled using 2 bins to specify a horizontal and vertical transforms to be used.

FIG. 13 shows a table (1300) illustrating a mapping relationship between the index (e.g., the mts_idx) value and respective horizontal or vertical transforms. A row (1301) with the mts_idx having a value of −1 corresponds to the scenario where the flag (e.g., the mts flag) is equal to 0, and DCT-2 transform is used. Rows (1302)-(1305) with the mts_idx having a value of 0, 1, 2, or 3 correspond to the scenario where the mts flag is equal to 1. In the right two columns of the table (1300), 0 represents a transform type of DCT-2, 1 represents a transform type of DST-7, and 2 represents a transform type of DCT 8.

FIGS. 14A-14D show transform core matrices of DST-7 transform. FIGS. 15A-15D show transform core matrices of DCT-8 transform.

6. Intra Sub-Partition (ISP) Coding Mode

Figure 17:
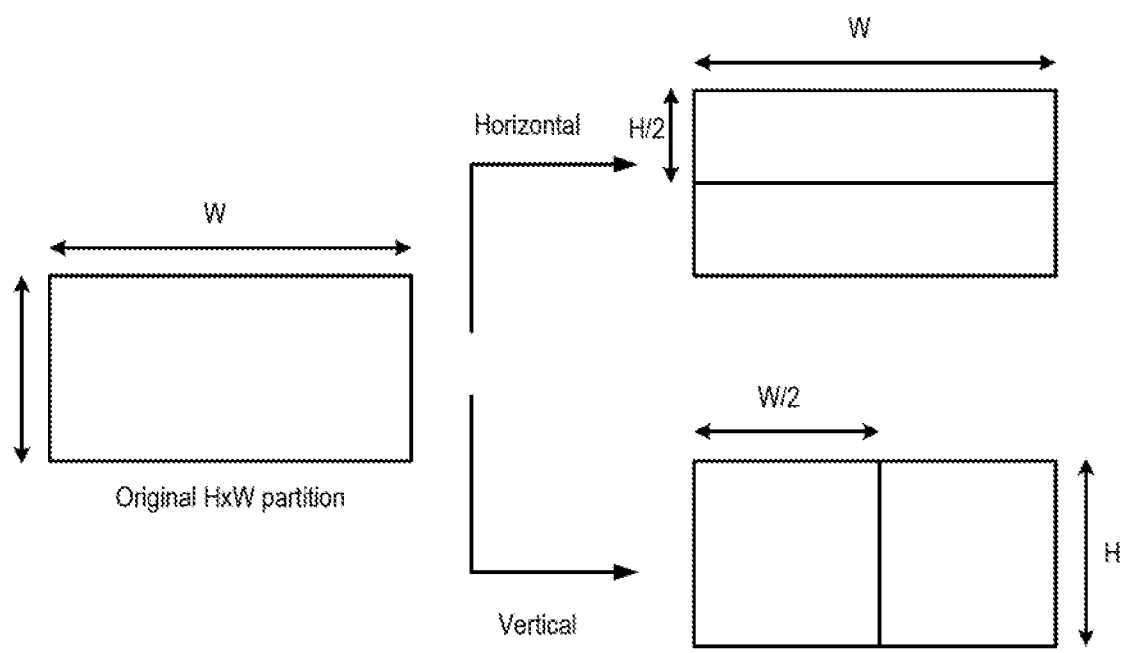
FIG. 17 shows an example of an intra sub-partition (ISP).
Figure 18:
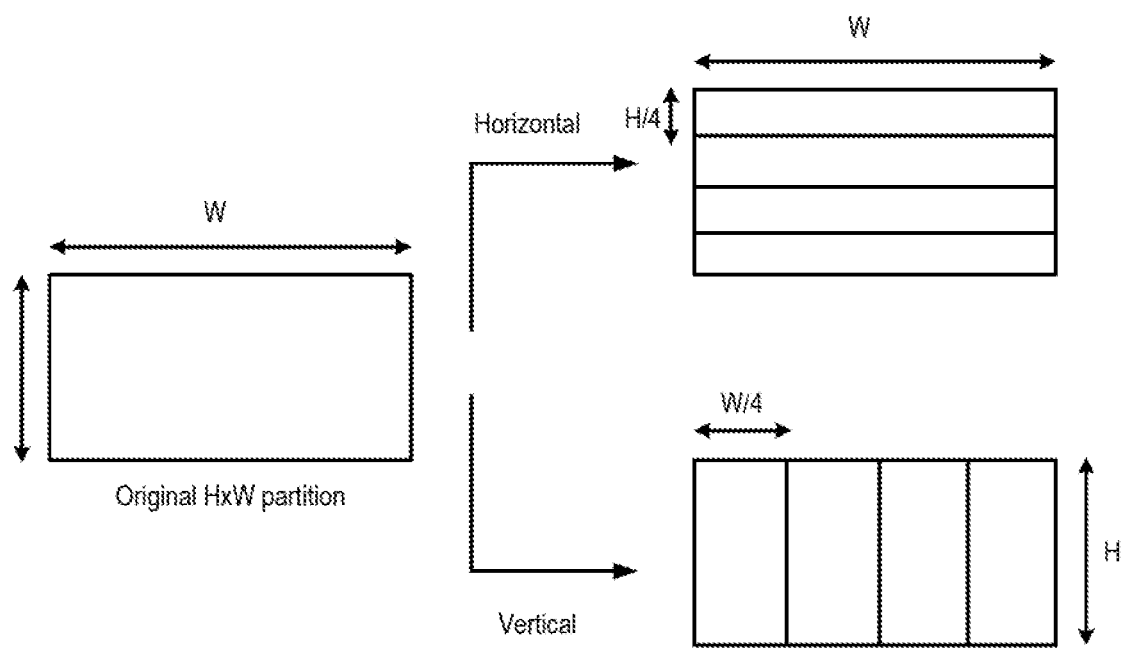
FIG. 18 shows an example of an ISP.
Figure 20A:
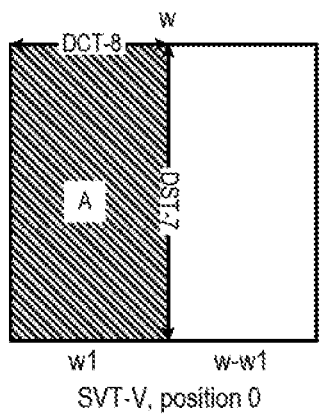
FIGS. 20A-20D show examples of a sub-block transform (SBT).
Figure 20B:
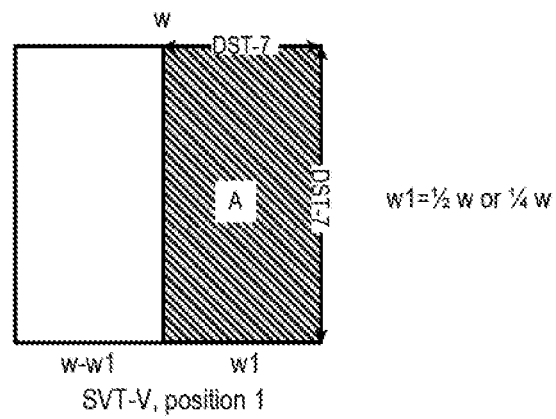
Figure 20C:
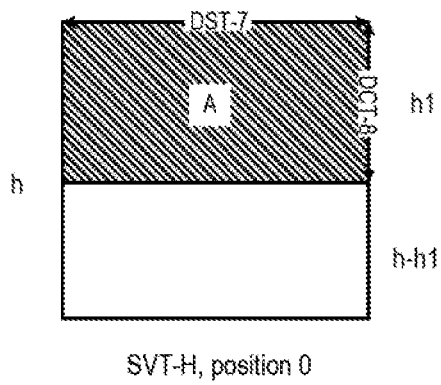
Figure 20D:
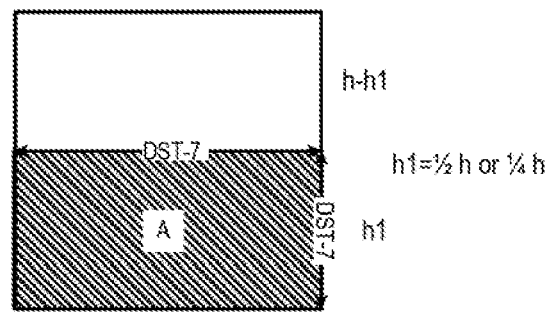

In some embodiments, an intra sub-partition (ISP) coding mode is employed. In ISP coding mode, a luma intra-predicted block can be partitioned vertically or horizontally into 2 or 4 sub-partitions. The number of sub-partitions can depend on a size of the block. FIG. 16 shows the number of sub-partitions depending on the block size. FIG. 17 shows an example where a block of 4×8 or 8×4 is partitioned into two sub-partitions. FIG. 18 shows an example where a block having a size that is larger than 4×8 or 8×4 is partitioned into four sub-partitions. In an example, all sub-partitions fulfill a condition of having at least 16 samples. In an example, ISP is not applied to chroma components.

In an example, for each of sub-partitions partitioned from a coding block, a residual signal is generated by entropy decoding respective coefficients sent from an encoder and then inverse quantizing and inverse transforming them. Then, a first one of the sub-partitions is intra predicted to generate a prediction signal. The prediction signal is added to the respective residual signal of the first sub-partition to obtain corresponding reconstructed samples. Thereafter, the reconstructed sample values of the first sub-partition can be available to generate a prediction of a second one of the sub-partitions. This process can be repeated sub-partition by sub-partition, until all sub-partitions from the coding block are reconstructed. In an example, all the sub-partitions share a same intra mode.

In an embodiment, the ISP coding mode is only tested with intra modes that are part of a most probable mode (MPM) list. Accordingly, if a block uses ISP, then a MPM flag can be inferred to be one. In addition, when ISP is used for a certain block, then a respective MPM list will be modified to exclude DC mode and to prioritize horizontal intra modes for the ISP horizontal split and vertical intra modes for the vertical one.

In ISP coding mode, each sub-partition can be regarded as a TU, since the transform and reconstruction is performed individually for each sub-partition.

FIGS. 19A-19B shows an example of syntax elements (1900) signaled for an ISP coding mode. As shown in a frame (1910), a syntax element, e.g., intra subpartitions mode flag, indicates whether ISP is used or not. A syntax element, e.g., intra subpartitions split flag, indicates a partition direction (vertical or horizontal).

7. Sub-Block Transform (SBT)

In some embodiments, a sub-block transform (SBT), also referred to as spatially varying transform (SVT), is employed. The SBT can be applied to inter prediction residuals. In some examples, residual block is included in the coding block and is smaller than the coding block. Thus a transform size in SBT is smaller than the coding block size. For the region which is not covered by the residual block, zero residual can be assumed, and thus no transform processing is performed.

FIGS. 20A-20D shows sub-block types (SVT-H, SVT-V) (e.g., horizontally or vertically partitioned), sizes and positions (e.g., left half, left quarter, right half, right quarter, top half, top quarter, bottom half, bottom quarter) supported in SBT. The shaded regions labeled by letter "A" is residual blocks with transform, and the other regions is assumed to be zero residual without transform.

As an example, FIGS. 21A-21I show changes to a specification text of a video coding standard (e.g., VVC) when SBT is used. The added texts are shown in frames from (2101) to (2113). As shown, additional syntax elements, e.g., additional overhead bits cu_sbt_flag, cu_sbt_quad_flag, cu_sbt_horizontal_flag, and cu_sbtpos_flag, can be signaled to indicate the sub-block type (horizontal or vertical), size (half or quarter) and position (left, right, top or bottom), respectively.

8. YUV Formats

Figure 22:
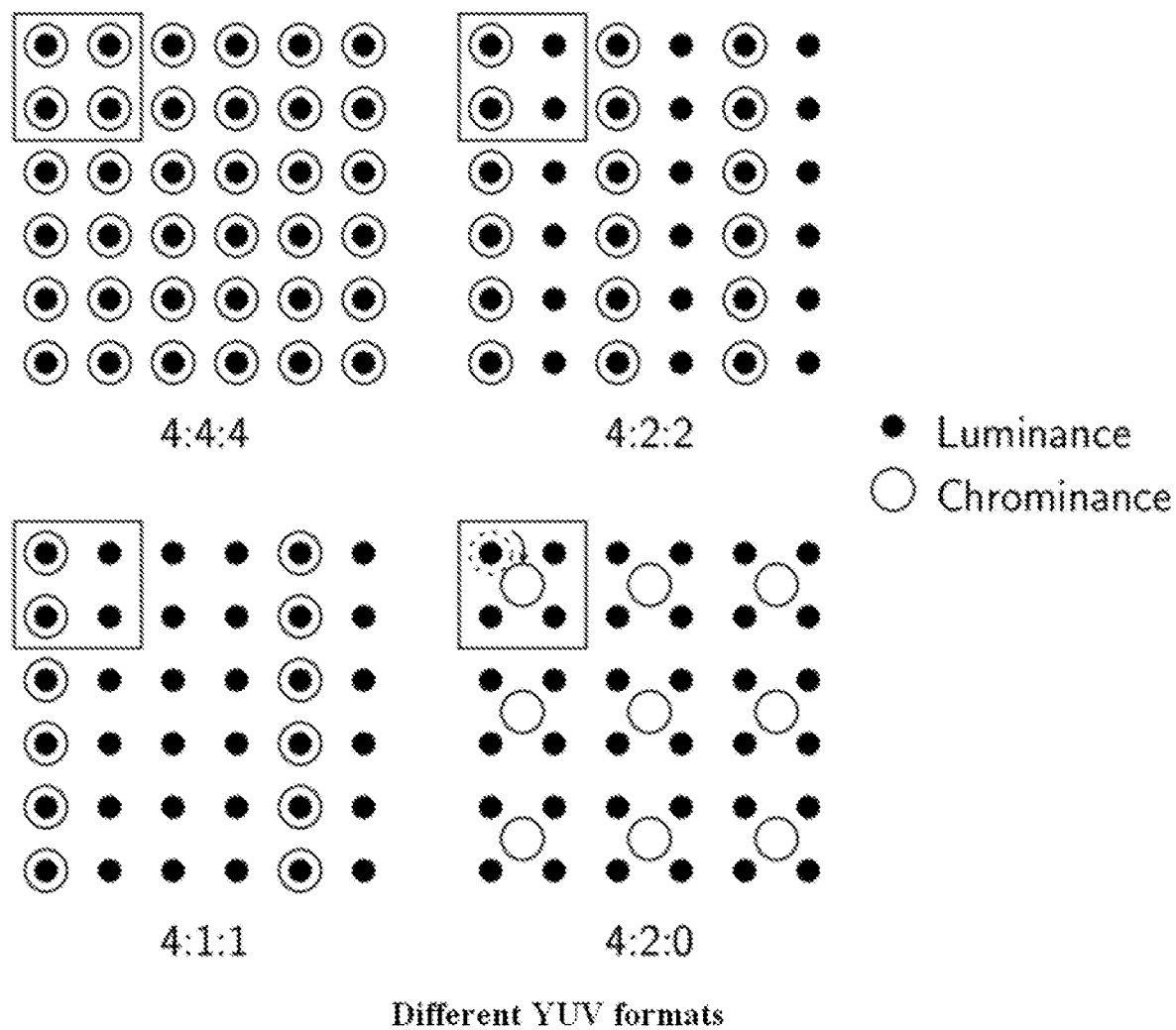
FIG. 22 shows different YUV formats used in some embodiments.

FIG. 22 shows different YUV formats (e.g., 4:4:4, 4:2:2, 4:1:1, and 4:2:0) used in some embodiments. In an example, a cross component linear model intra prediction is used for the 4:2:0 format. A six-tap interpolation filter can be applied to obtain a down-sampled luma sample corresponding to a chroma sample as shown in FIG. 22. In an example, a down-sampled luma sample Rec'L[x, y] can be calculated from nearby reconstructed luma samples (represented by $Rec_L[x, y]$) as follows:

$$Rec'_L[x,y]=(2 \times Rec_L[2x,2y]+2 \times Rec_L[2x,2y+1]+Rec_L[2x-1,2y]+Rec_L[2x+1,2y]+Rec_L[2x-1,2y+1]+Rec_L[2x+1,2y+1]+4)>>3$$

The down-sampled luma sample Rec'L[x, y] can be used to predict a chroma sample using a cross component linear model mode.

9. Virtual Pipeline Data Unit (VPDU)

Virtual pipeline data units (VPDUs) can be defined as non-overlapping M×M-luma (L)/N×N-chroma (C) units in a picture. In some hardware decoder implementations, successive VPDUs are processed by multiple pipeline stages at the same time. Different stages process different VPDUs simultaneously. A VPDU size can be roughly proportional to a buffer size in pipeline stages, so that it is desired to keep the VPDU size at a certain size (e.g., 64×64 or smaller). In certain decoders, a VPDU size is set to a maximum transform unit (TU) size. Enlarging a maximum TU size from 32×32-L/16×16-C in HEVC to 64×64-L/32×32-C in current VVC can bring a coding gain, which expectedly results in 4 times of VPDU size in comparison with HEVC. However, BT and TT structures that are adopted in VVC for achieving additional coding gains can be applied to 128×128-L/64×64-C coding tree blocks recursively, leading to 16 times of VPDU size (128×128-L/64×64-C) in comparison with HEVC.

Figure 23:
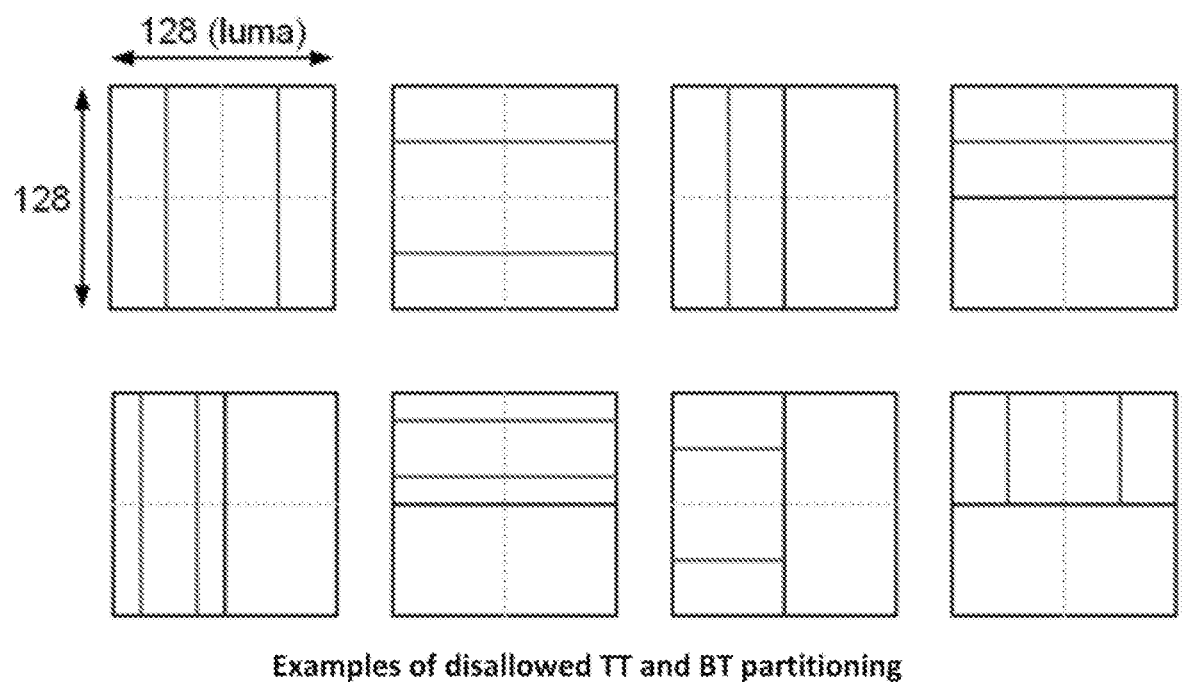
FIG. 23 shows examples of disallowed ternary tree (TT) and binary tree (BT) partitioning.

FIG. 23 shows certain TT and BT partitioning that are disallowed.

In order to keep the VPDU size as 64×64 luma samples, certain partition restrictions (with syntax signaling modification) are applied in some embodiments:

TT split is not allowed for a CU with either width or height, or both width and height equal to 128.

For a 128×N CU with N≤64 (i.e., width equal to 128 and height smaller than 128), horizontal BT is not allowed.

For an N×128 CU with N≤64 (i.e., height equal to 128 and width smaller than 128), vertical BT is not allowed.

III. Transform Block Partitioning and Processing Techniques

In some embodiments, a fixed maximum allowable transform unit (TU) size or maximum TU size (e.g., 64×64 pixels or samples) is used. In some embodiments, controllable or configurable maximum TU sizes are employed since a maximum TU size can have an impact on hardware complexity, such as for encoder implementation (e.g., pipeline intermediate buffer size, number of multipliers, and the like). For example, in addition to a size of 64×64 samples, a maximum TU size can be of other sizes, such as 32×32 samples, 16×16 samples, or the like.

In certain video standards, SBT and ISP can be used. For example, in SBT, a SPS flag, e.g., sps_sbt_max_size 64 flag is signaled to indicate whether a largest SBT size is 32-length or 64-length. When sps_sbt_max_size 64 flag is true (i.e., the largest SBT size is 64-length) and the maximum TU size is 32-point, an encoder crash may be triggered. In general, an L-length or L-point size refers to a maximum dimension of a CU, a TU, a CB, a TB, a VPDU, or the like. For example, when the maximum TU size is 32-point or 32-length, a width and a height of a TU are less than or equal to 32.

In some embodiments, the ISP mode is allowed for various CU sizes, however, when the maximum TU size is set to be smaller than 64, a conflict can occur whether an implicit transform split is performed or an explicit transform split using ISP with signaling is performed. For example, when the maximum TU size is 16, for a 64×16 CU, without ISP, the CU can be implicitly split into four 16×16 TUs. With ISP, the 64×16 CU may be partitioned with a vertical ISP and thus may be split into four 16×16 TUs, but using signaling.

When the maximum TU size is smaller than 64×64, a TU processing order is needed to align with an implementation of VPDUs.

Embodiments described herein may be used separately or combined in any order. Further, the embodiments may be implemented by processing circuitry (e.g., one or more processors or one or more integrated circuits) in an encoder, a decoder, or the like. In one example, the one or more processors execute a program that is stored in a non-transitory computer-readable medium.

In the disclosure, a high-level syntax (HLS) element can refer to a Video Parameter Set (VPS), a Sequence Parameter Set (SPS), a Picture Parameter Set (PPS), a Slice header, a Tile header, a Tile group header, or the like. A CTU header can refer to syntax element(s) signaled for a CTU, e.g., as header information. In an example, a CTU size is a maximum CU size.

In general, when a luma size (represented by luma samples) of a certain unit (e.g., a TU, a CU) is known, a corresponding chroma size that is specified by a number of chroma samples can be obtained. In an example, a YUV format is 4:2:0 is used and a CU has a CU size of 64×64 luma samples (or 64×64-L). Accordingly, the CU has a CU size of 32×32 chroma samples (or 32×32-C). The CU size can be referred to as 64×64-L, 32×32-C, or 64×64-L/32×32-C. Similarly, a TU has a TU size of 64×64 luma samples (or 64×64-L). Accordingly, the TU has a TU size of 32×32 chroma samples (or 32×32-C). The TU size can be referred to as 64×64-L, 32×32-C, or 64×64-L/32×32-C. For example, the TU includes a luma transform block (TB) and two chroma TBs. The luma TB has a size of 64×64-L and each of the chroma TBs has a size of 32×32-C. In general, embodiments and methods described for a CU or a TU can be suitably adapted to a CB and a TB, respectively.

The CU can include a luma block of 64×64-L and two chroma blocks of 32×32-C. In the descriptions below, a TU size is represented using luma samples in the TU. For example, a maximum TU size of M samples refers to a maximum TU size of M luma samples. Similarly, other sizes, such as a VPDU size and a CU size, are also represented using respective luma samples in corresponding units, such as a VPDU and a CU, respectively. Of course, the TU size, the VPDU size, the CU size, or the like can be represented using chroma samples or a combination of luma and chroma samples.

A unit size may refer to a width, a height, or an area of the unit. For example, a maximum TU size may refer to a width, a height, or an area of a maximum TU. In general, a TU, a CU, a VPDU, or the like can have any suitable shape, including a rectangular shape, a square shape, an 'L' shape, or any suitable shape. When the shape of the unit is irregular, such as an 'L' shape, the unit size can specify an area of the unit.

In some embodiments, a VPDU size and/or a maximum TU size can be signaled in a coded video bitstream, such as in a SPS and a PPS. As described above, the VPDU size and/or the maximum TU size can be signaled in terms of luma samples. Alternatively, the VPDU size and/or the maximum TU size can be signaled in terms of chroma samples.

In some embodiments, a VPDU size and/or a maximum TU size can be stored in an encoder and/or a decoder, thus the VPDU size and/or the maximum TU size is not signaled. In one example, the VPDU size and/or the maximum TU size can be stored in profile and/or level definitions. The VPDU size and/or the maximum TU size can be stored in terms of luma or chroma samples.

In some embodiments, VPDUs share the same size but may have different shapes. For example, when a VPDU size is 4096 in terms of luma samples, the VPDU can have a square shape of 64×64 or a rectangular shape of 32×128. The VPDU can also have other shapes, such as an L shape, as long as the VPDU size is 4096 in terms of luma samples. The above description is also applicable to certain TUs.

1. Example A

According to aspects of the disclosure, a maximum allowable TU size (also referred to as a maximum TU size) is M samples (e.g., a size of M×M samples). In an example, the maximum width and the maximum height of the TU is M. In an example, the maximum area of the TU is M×M. A processing data unit size (such as a VPDU size) is K samples (e.g., a size of K×K samples). In an example, the maximum width and the maximum height of the processing data unit size is K. In an example, the maximum area of the processing data unit size is K×K. A CU of W×H has a width of W samples and a height of H samples. The CU can be partitioned into multiple sub-units, referred to as sub-processing units (SPUs), based on the CU size and the processing data unit size K. The CU can be partitioned into the SPUs using any suitable partitioning structures or a combination of any suitable partitioning structures, such as QTBT, QT, BT, TT, or a combination thereof. The SPUs may have a same size or different sizes.

In an embodiment, the CU is partitioned into the SPUs when the width W or the height H is larger than K. In an example, the SPUs have a same size (i.e., a SPU size) and each SPU has a size of Min(W, K)×Min(H, K) samples. Thus, a width of each SPU is a minimum of W and K, and a height of the SPU is a minimum of H and K. In some examples, prior to partitioning the CU, whether to partition the CU can be determined based on the size of the CU and the processing data unit size K.

A SPU in the CU can be further partitioned into TUs having a size of, for example, M×M samples. In some examples, the SPU can be partitioned into the TUs having a size of Min(W, K, M)×Min(H, K, M). In some examples, prior to partitioning the SPU, whether to partition the SPU can be determined based on the size of the SPU and the maximum TU size M. The SPU can be partitioned using any suitable partitioning structures or a combination of any suitable partitioning structures, such as QTBT, QT, BT, TT, or a combination thereof. According to aspects of the disclosure, one or more partitioning structures to partition the SPU can be determined based on the size of the SPU and the maximum TU size M. In an example, the SPU can be recursively split into the TUs using the determined one or more partitioning structures.

In an example, when the width and the height of the SPU are larger than the maximum TU size M, the SPU is split into the TUs of M×M using a quadtree partitioning structure. The SPU can be recursively split into the TUs using the quadtree partitioning structure.

In an example, when the width of the SPU is larger than M and the height of the SPU is equal to M, the SPU is split into the TUs of M×M using a vertical binary tree partitioning structure. For example, M is 32 and the SPU has a size of 64×32. Thus the width of the SPU is 64 and the height of the SPU is 32. Accordingly, the vertical binary tree partitioning structure can be used to split the SPU into two TUs of 32×32. The SPU can be recursively split into the TUs using the vertical binary tree partitioning structure.

In an example, when the width of the SPU is larger than M and the height of the SPU is less M, the SPU can be split into the TUs using the vertical binary tree partitioning structure where the width of the TUs is M and the height of the TUs is equal to the height of the SPU.

In an example, when the height of the SPU is larger than M and the width of the SPU is equal to M, the SPU is split into the TUs of M×M using a horizontal binary tree partitioning structure. The SPU can be recursively split into the TUs using the horizontal binary tree partitioning structure. For example, M is 32 and the SPU has a size of 32×64. Thus the width of the SPU is 32 and the height of the SPU is 64. Accordingly, the horizontal binary tree partitioning structure can be used to split the SPU into two TUs of 32×32.

When the height of the SPU is larger than M and the width of the SPU is less M, the SPU can be split into the TUs using the horizontal binary tree partitioning structure where the height of the TUs is M and the width of the TUs is equal to the width of the SPU.

The transform tree syntax in FIG. 24 shows an example of splitting the SPU and a processing order used to process the TUs.

In an example, the CU of W×H can be partitioned in two steps. In a first step, the CU is partitioned into the SPUs where each SPU has the size of Min(W, K)×Min(H, K). Subsequently, in a second step, each SPU is further partitioned into the TUs where each TU has the size of M×M.

When processing the TUs in the CU, the SPUs in the CU can be scanned and processed in a first scan order (also referred to as a first order). Further, within each of the SPUs, the TUs can be scanned and processed in a second order (also referred to as a second order).

In various embodiments, the first order for processing the SPUs can be a raster scan order, a vertical scan order (e.g., scans SPUs column-wise from left to right or vice versa), a zig-zag order, a diagonal scan order, or the like.

In various embodiments, the second order for processing the TUs within each SPU can be a raster scan order, a vertical scan order (e.g., scans the TUs column-wise from left to right or vice versa), a zig-zag order, a diagonal scan order, or the like.

The first order and the second order can be the same or different in different embodiments. For example, the first order for processing the SPUs and the second order for processing the TBs within each of the SPUs are both the raster scan order in an embodiment.

2. Example B

Figure 25:
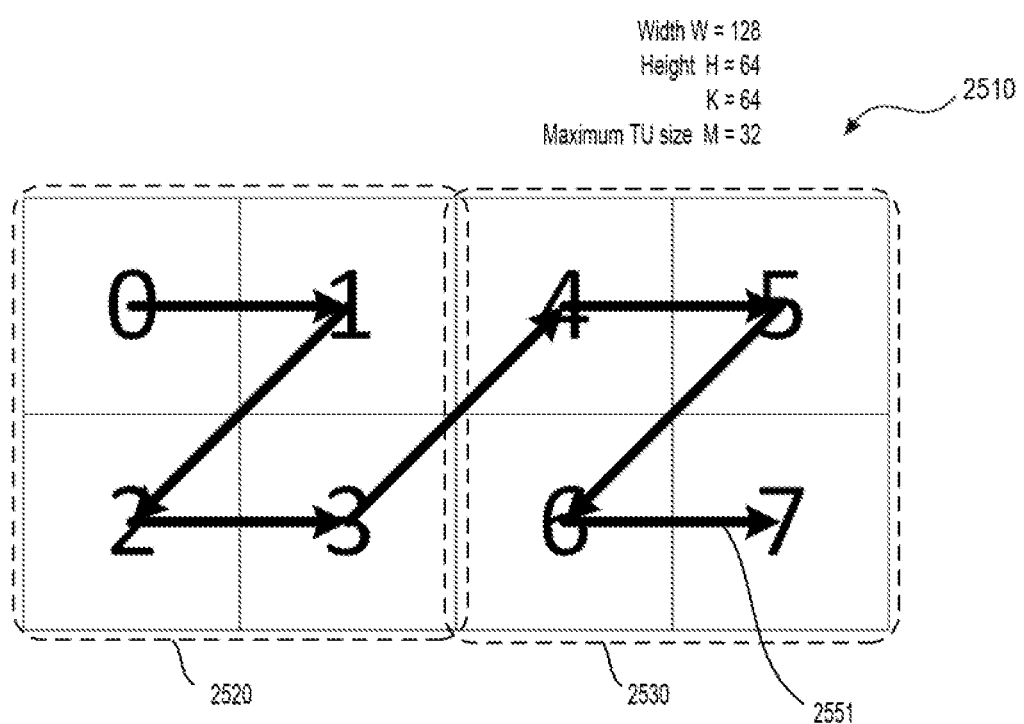
FIG. 25 shows a coding block (2510) having a size of 128×64 samples.

FIG. 25 shows a CU (2510) having a size of W×H samples where W=128, and H=64. A maximum TU size M is 32 samples. The processing data unit size K, such as a VPDU size, is 64 samples. The CU (2510) is first split into a first 64×64 SPU (2520) and a second 64×64 SPU (2530). The first SPU (2520) and the second SPU (2530) can then be further partitioned into TUs 0-7 each having a size of M×M samples. The TUs 0-3 are included in the first SPU (2520), and the TUs 4-7 are included in the second SPU (2530).

According to the first order, the first SPU (2520) can first be processed followed by the second SPU (2530). Within the first SPU (2520) or the second SPU (2530), the second order used for processing the TUs 0-3 or 4-7 is the raster scan order. Accordingly, the TUs 0-7 are processed according to an order indicated by arrows (2551). The first order and/or the second order can be determined explicitly (e.g., via signaling from an encoder to a decoder) or implicitly.

In some examples, partitioning a CU into SPUs where each of the SPUs further includes TUs as described above improves coding efficiency. Referring to FIG. 25, in an example, the first SPU (2520) is a first VPDU and the second SPU (2530) is a second VPDU. Each of the first VPDU (or the first SPU (2520)) and the second VPDU (or the second SPU (2530)) can sequentially pass through a multi-stage pipeline including a first stage (e.g., entropy decoding), a second stage (e.g., de-quantization), a third stage (e.g., an inverse transform), and/or the like. According to the first order shown in FIG. 25, the first SPU (2520) is to be processed prior to the second SPU (2530), thus the first SPU (2520) is processed by the first stage and then goes to the second stage. In an example, when the first SPU (2520) is processed by the second stage, the second SPU (2530) is processed by the first stage to improve the coding efficiency. Subsequently, the first SPU (2520) goes to the third stage and the second SPU (2530) can move to the second stage. When the first SPU (2520) is processed by the third stage, the second SPU (2530) can be processed by the second stage. The above description is given using VPDUs and a multi-stage pipeline as an example and can be suitably adapted to other architectures or video coding methods. The above description can be adapted when the first SPU (2520) is included in the first VPDU and the second SPU (2530) is included in the second VPDU. At least a part of the processing of the SPUs in the different stages is performed simultaneously.

As described above, when the SPU size is larger than the TU size, multiple TUs in the CU can be grouped into a processing data unit, such as a SPU (or a VPDU) where the SPUs can be processed in a multi-stage pipeline that allows parallel processing (or simultaneous processing) of successive SPUs. In some examples, The description can be modified as follows: the CU is partitioned into first units. Further, each of the first units can be partitioned into second units. Each of the second units may be partitioned into third units. In an example, a size of the first units is larger than a size of the second units, and the size of the second units is larger than a size of the third units. Such partitioning may be beneficial when a first multi-stage pipeline is nested within a second multi-stage pipeline.

3. Example C

Figure 26A:
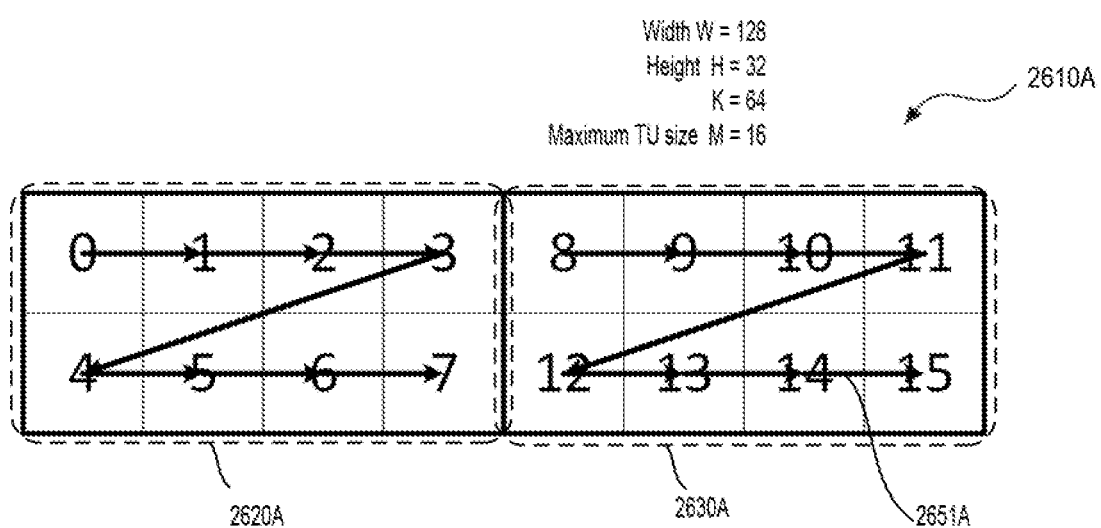
FIG. 26A shows a coding block (2610A) having a size of 128×32 samples.

FIG. 26A shows a CU (2610A) having a size of W×H samples where W=128, and H=32. The maximum TU size M is 16 samples. The processing data unit size K, such as a VPDU size, is 64 samples. A minimum of W and K is 64, while a minimum of H and K is 32. Thus, a size of a SPU can be determined to be 64×32 samples, for example, to align transform blocks with VPDUs. The CU (2610A) can be partitioned into a left SPU (2620A) and a right SPU (2630A) each having a size of 64×32 samples. The two SPUs (2620A) and (2630A) can be scanned and processed in an order from left to right.

Each of the two SPUs (2620A) and (2630A) can be further split into TUs each having the maximum TU size, 16×16 samples. As shown, the left SPU (2620A) is partitioned into the TUs 0-7, while the right SPU (2630A) is partitioned into the TUs 8-15. In the SPU (2620A), the TUs 0-7 can be processed in the raster scan order. In the SPU (2630A), the TUs 8-15 can be processed in the raster scan order. Accordingly, the TUs 0-15 can be scanned and processed in an order indicated by arrows (2651A) where the TU 0 is processed first and the TU 15 is processed after the TUs 0-14 are processed.

4. Example D

Figure 26B:
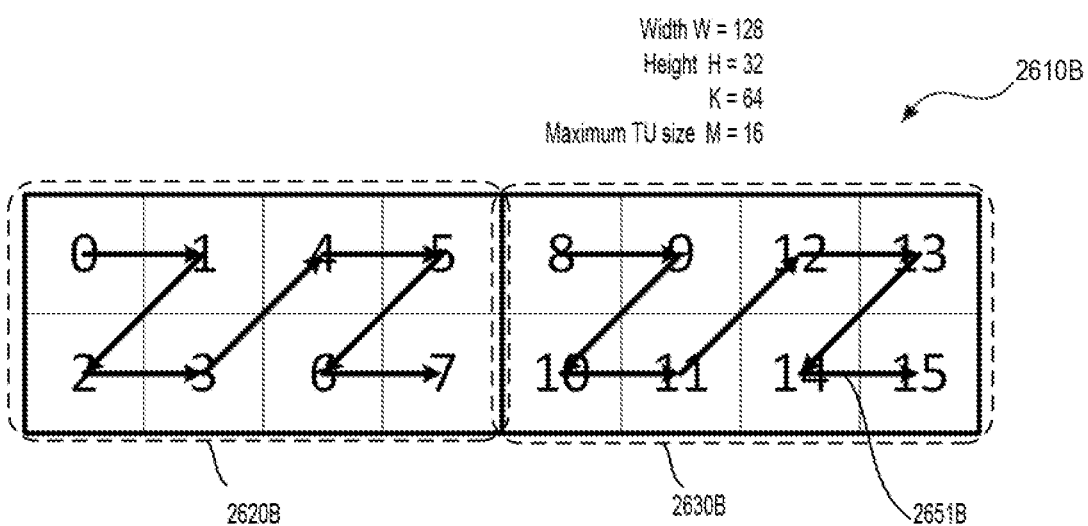
FIG. 26B shows a coding block (2610B) having a size of 128×32 samples.

FIG. 26B shows a CU (2610B) having a size of W×H samples where W=128, and H=32. The maximum TU size M is 16 samples. The processing data unit size K, such as a VPDU size, is 64 samples. In a similar way as in the FIG. 25 example, the CU (2610B) can be partitioned into two SPUs (2620B) and (2630B) that can each be further partitioned into TUs. The SPUs (2620B) and (2630B) can be processed from left to right in the same order as in FIG. 25. However, different from the FIG. 25 example, the TUs 0-7 in the SPU (2620B) are processed in the zig-zag scan order, and the TUs 8-15 in the SPU (2630B) are processed in the zig-zag scan order.

5. Example E

Figure 27:
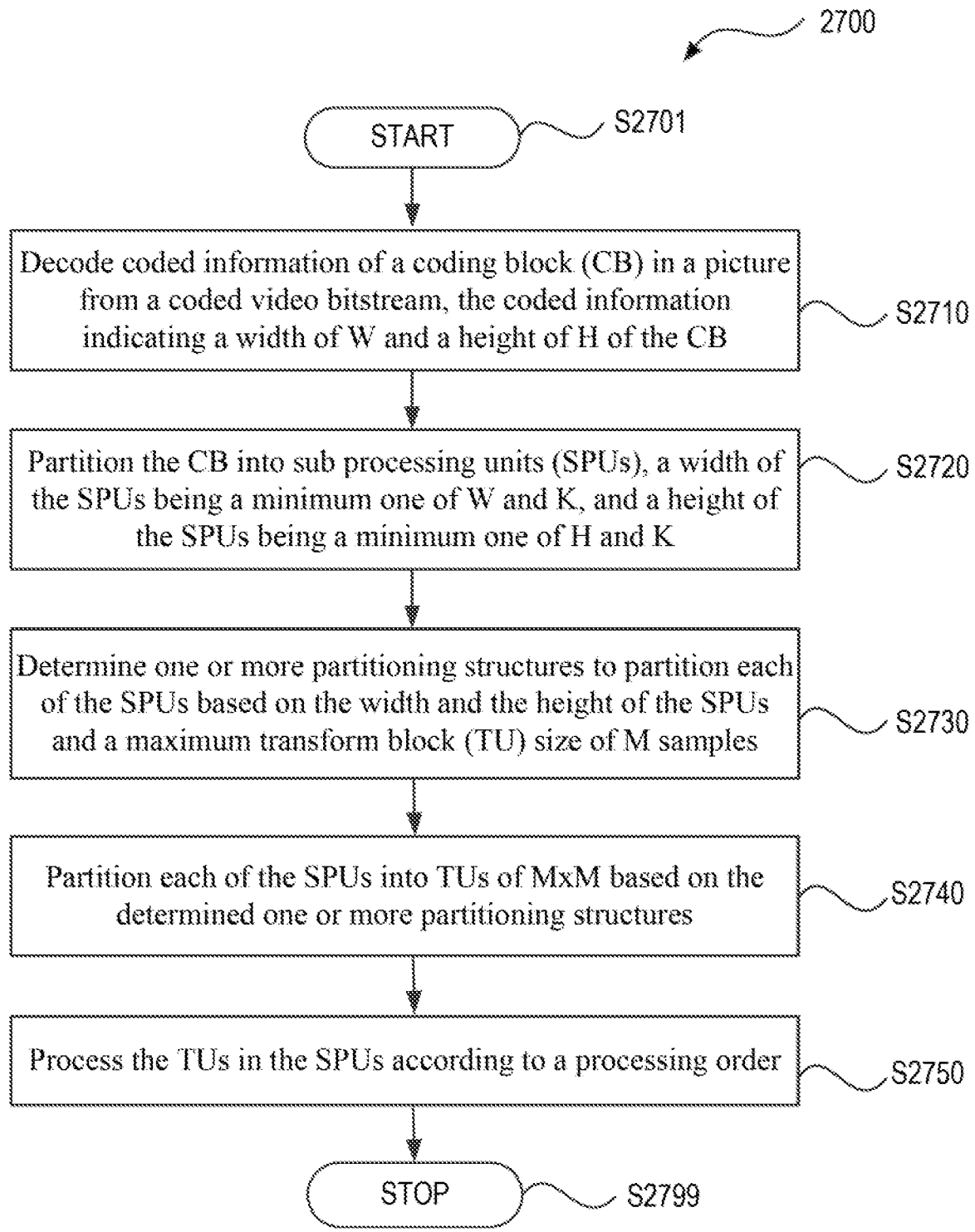
FIG. 27 shows a flow chart outlining a process (2700) according to an embodiment of the disclosure.

FIG. 27 shows a flow chart outlining a transform block partitioning and processing process (2700) according to an embodiment of the disclosure. The process (2700) can be used in the reconstruction of a block coded in intra mode or inter mode. In various embodiments, the process (2700) are executed by processing circuitry, such as the processing circuitry in the terminal devices (210), (220), (230) and (240), the processing circuitry that performs functions of the video encoder (403), the processing circuitry that performs functions of the video decoder (310), the processing circuitry that performs functions of the video decoder (410), the processing circuitry that performs functions of the video encoder (603), and the like. In some embodiments, the process (2700) is implemented in software instructions, thus when the processing circuitry executes the software instructions, the processing circuitry performs the process (2700). The process starts at (S2701) and proceeds to (S2710).

At (S2710), coded information of a CU in a picture can be decoded from a coded video bitstream. The coded information can indicate a width of W samples and a height of H samples of the CU.

At (S2720), the CU can be partitioned into SPUs, for example, when at least one of the width W and the height H of the CU is larger than the processing data unit size K, such as described with reference to FIGS. 24-26. Based on the processing data unit size K and the size of the CU, a size of the SPUs can be determined. A width of the SPUs can be a minimum one of W and K, and a height of the SPUs can be a minimum one of H and K. Accordingly, the CU can be partitioned into the SPUs each having the determined width and height. For example, when W is 128, H is 64, and K is 64, the CU can be divided into a first SPU of 64×64 and a second SPU of 64×64. For example, the processing data unit can be a VPDU, and thus K can be a VPDU size.

At (S2730), one or more partitioning structures to partition each of the SPUs can be determined, for example, based on one or a combination of the width and the height of the SPUs and a maximum TU size of M samples. In an example, at least one of the width and the height of the SPUs is larger than M.

As described above, any suitable partitioning structure can be used to partition or split each of the SPUs. In an example, when the width and the height of the SPU are larger than M, the one or more partitioning structures is determined to be a quadtree partitioning structure. In an example, when the width of the SPU is larger than M and the height of the SPU is not larger than M, the one or more partitioning structures is determined to be a vertical binary tree partitioning structure. In an example, when the height of the SPU is larger than M and the width of the SPU is not larger than M, the one or more partitioning structures is determined to be a horizontal binary tree partitioning structure.

At (S2740), each of the SPUs can be partitioned into TUs based on the determined one or more partitioning structures. In an example, the respective SPU can be recursively partitioned into the TUs using the determined one or more partitioning structures.

At (S2750), the TUs of the SPUs are processed according to a processing order. For example, the SPUs can be processed according to the first order, and the TUs in each of the SPUs can be processed according to the second order, as described above. Residual data of each TU can be determined by various decoding operations (e.g., entropy decoding of transform coefficients, inverse quantization or de-quantization, inverse transforming, and/or the like). The process (2700) can proceed to (S2799) and terminate.

The process (2700) is described using a CU as an example. The process (2700) can be suitably adapted for a CB, such as a luma block, a chroma block, or the like. For purposes of brevity, the description for a CB is omitted.

The process (2700) can be suitably adapted. For example, one or more steps can be modified, omitted, or combined. For example, steps (S2730) and (S2740) can be combined into a single step. Additional step(s) can also be added. An order that the process (2700) is executed can also be modified.

IV. Computer System

The techniques described above, can be implemented as computer software using computer-readable instructions and physically stored in one or more computer-readable media. For example, FIG. 28 shows a computer system (2800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 28:
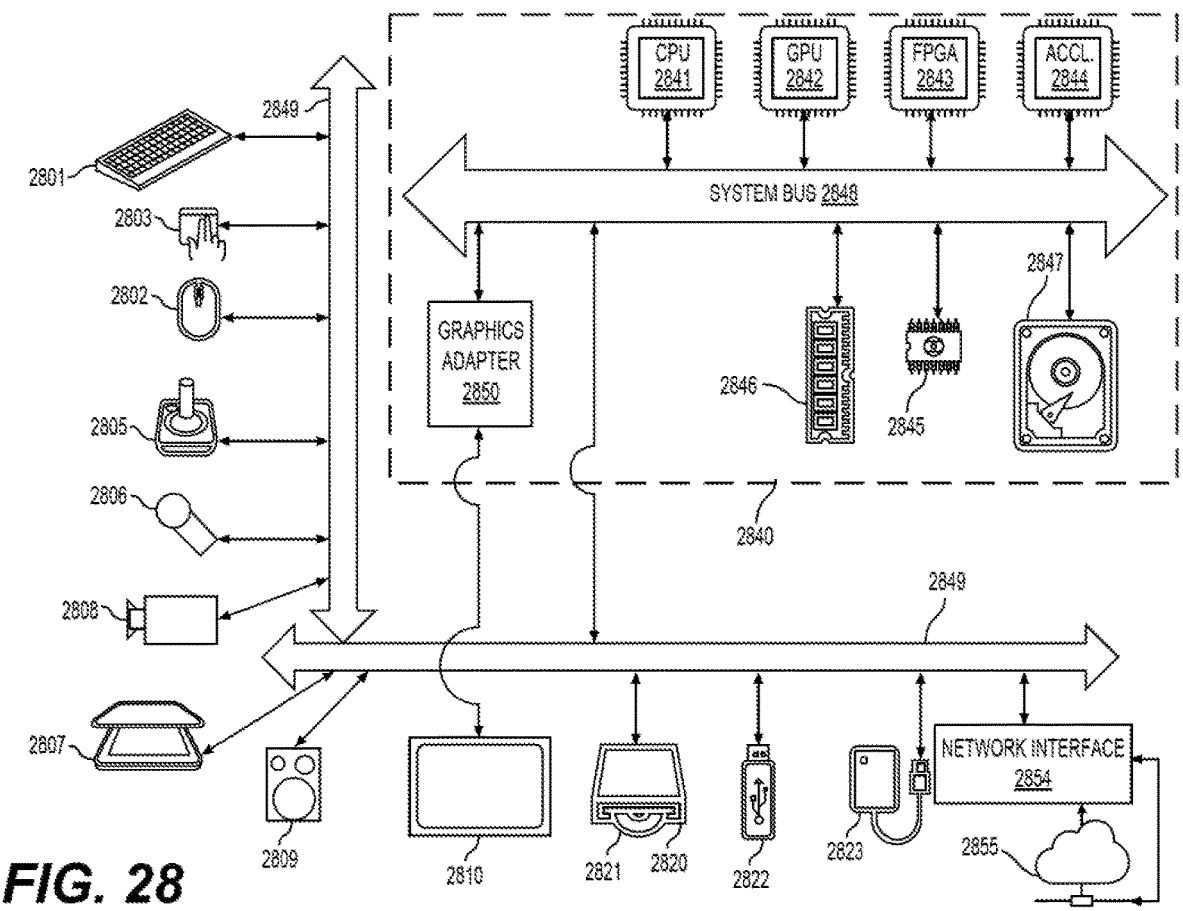
FIG. 28 is a schematic illustration of a computer system in accordance with an embodiment.

The components shown in FIG. 28 for computer system (2800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2800).

Computer system (2800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2801), mouse (2802), trackpad (2803), touch screen (2810), data-glove (not shown), joystick (2805), microphone (2806), scanner (2807), camera (2808).

Computer system (2800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2810), data-glove (not shown), or joystick (2805), but there can also be tactile feedback devices that do not serve as input devices), audio output devices (such as: speakers (2809), headphones (not depicted)), visual output devices (such as screens (2810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2800) can also include human accessible storage devices and their associated media such as optical media including CD/DVD ROM/RW (2820) with CD/DVD or the like media (2821), thumb-drive (2822), removable hard drive or solid state drive (2823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2800) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2849) (such as, for example USB ports of the computer system (2800)); others are commonly integrated into the core of the computer system (2800) by attachment to a system bus as described below (for example Ethernet interface into a PC computer system or cellular network interface into a smartphone computer system). Using any of these networks, computer system (2800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2840) of the computer system (2800).

The core (2840) can include one or more Central Processing Units (CPU) (2841), Graphics Processing Units (GPU) (2842), specialized programmable processing units in the form of Field Programmable Gate Areas (FPGA) (2843), hardware accelerators for certain tasks (2844), and so forth. These devices, along with Read-only memory (ROM) (2845), Random-access memory (2846), internal mass storage such as internal non-user accessible hard drives, SSDs, and the like (2847), may be connected through a system bus (2848). In some computer systems, the system bus (2848) can be accessible in the form of one or more physical plugs to enable extensions by additional CPUs, GPU, and the like. The peripheral devices can be attached either directly to the core's system bus (2848), or through a peripheral bus (2849). Architectures for a peripheral bus include PCI, USB, and the like.

CPUs (2841), GPUs (2842), FPGAs (2843), and accelerators (2844) can execute certain instructions that, in combination, can make up the aforementioned computer code. That computer code can be stored in ROM (2845) or RAM (2846). Transitional data can be also be stored in RAM (2846), whereas permanent data can be stored for example, in the internal mass storage (2847). Fast storage and retrieve to any of the memory devices can be enabled through the use of cache memory, that can be closely associated with one or more CPU (2841), GPU (2842), mass storage (2847), ROM (2845), RAM (2846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2800), and specifically the core (2840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2840) that are of non-transitory nature, such as core-internal mass storage (2847) or ROM (2845). The software implementing various embodiments of the present disclosure can be stored in such devices and executed by core (2840). A computer-readable medium can include one or more memory devices or chips, according to particular needs. The software can cause the core (2840) and specifically the processors therein (including CPU, GPU, FPGA, and the like) to execute particular processes or particular parts of particular processes described herein, including defining data structures stored in RAM (2846) and modifying such data structures according to the processes defined by the software. In addition or as an alternative, the computer system can provide functionality as a result of logic hardwired or otherwise embodied in a circuit (for example: accelerator (2844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

ASIC: Application-Specific Integrated Circuit
BMS: benchmark set
CANBus: Controller Area Network Bus
CBF: Coded Block Flag
CD: Compact Disc
CPUs: Central Processing Units
CRT: Cathode Ray Tube
CTBs: Coding Tree Blocks
CTUs: Coding Tree Units
CU: Coding Unit
DVD: Digital Video Disc
FPGA: Field Programmable Gate Areas
GOPs: Groups of Pictures
GPUs: Graphics Processing Units
GSM: Global System for Mobile communications
HEVC: High Efficiency Video Coding HRD: Hypothetical Reference Decoder
ISP: Intra Sub-Partitions
IC: Integrated Circuit
JEM: joint exploration model
LAN: Local Area Network
LCD: Liquid-Crystal Display
LTE: Long-Term Evolution
MPM: Most Probable Mode
MV: Motion Vector
OLED: Organic Light-Emitting Diode
PBs: Prediction Blocks
PCI: Peripheral Component Interconnect
PLD: Programmable Logic Device
PUs: Prediction Units
RAM: Random Access Memory
ROM: Read-Only Memory
SBT: Sub-block Transform
SEI: Supplementary Enhancement Information
SNR: Signal Noise Ratio
SSD: solid-state drive
TUs: Transform Units,
USB: Universal Serial Bus
VPDU: Virtual Pipeline Data Unit
VUI: Video Usability Information
VVC: versatile video coding While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
    decoding coded information of a coding block (CB) in a picture from a coded video bitstream, the coded information indicating a width of the CB as W samples and a height of the CB as H samples;
    determining a maximum transform unit (TU) size M based on whether at least one of the width W of the CB or the height H of the CB is greater than 64, the maximum TU size M being equal to 64 responsive to the at least one of the width W of the CB or the height H of the CB being greater than 64, and equal to a maximum CB size responsive to the width W of the CB and the height H of the CB not being greater than 64;
    determining a width parameter based on whether the width W of the CB is greater than the maximum TU size M, the width parameter being equal to half of the width W of the CB responsive to the width W of the CB being greater than the maximum TU size M, and the width parameter being equal to the width W of the CB responsive to the width W of the CB not being greater than the maximum TU size M;
    determining a height parameter based on whether the height H of the CB is greater than the maximum TU size M, the height parameter being equal to half of the height H of the CB responsive to the height H of the CB being greater than the maximum TU size M, and the height parameter being equal to the height H of the CB responsive to the height H of the CB not being greater than the maximum TU size;
    determining which partitioning structure from among plural partitioning structures is selected to partition the CB based on the width W of the CB, the height H of the CB, and the maximum TU size M, the selected partitioning structure partitioning the CB based on the determined width and height parameters and the plural partitioning structures comprising a vertical binary tree partitioning structure and a horizontal binary tree partitioning structure; and
    recursively partitioning the CB into a plurality of TUs until a size of each TU is less than or equal to M×M based on the partitioning structure that is determined as selected from among the plural partitioning structures.

2. The method of claim 1, wherein
    the plural partitioning structures further comprises a quadtree partitioning structure;
    the selected partitioning structure is the vertical binary tree partitioning structure in response to the width W being greater than M, the height H not being larger than M, and the width W being greater than the height H;
    the selected partitioning structure is the horizontal binary tree partitioning structure in response to the height H being greater than M, the width W not being larger than M, and the height H being greater than the width W; and
    the selected partitioning structure is the quadtree partitioning structure in response to both the width W and the height H of the CB being larger than M.

3. The method of claim 1, wherein
    the maximum TU size M is 32;
    the width W of the CB is 64 and the height H of the CB is equal to M;
    the selected partitioning structure is determined as the vertical binary tree partitioning structure in the plural partitioning structures; and
    the recursively partitioning the CB includes partitioning the CB into two TUs based on the vertical binary tree partitioning structure, each TU having a size of 32×32.

4. The method of claim 1, wherein
    the maximum TU size M is 32;
    the height H of the CB is 64 and the width W of the CB is equal to M;
    the selected partitioning structure is determined as the horizontal binary tree partitioning structure in the plural partitioning structures; and
    the recursively partitioning the CB includes partitioning the CB into two TUs based on the horizontal binary tree partitioning structure, each TU having a size of 32×32.

5. The method of claim 1, further comprising:
    processing the TUs according to a scan order that is one of (i) a raster scan order, (ii) a vertical scan order, (iii) a zig-zag order, and (iv) a diagonal scan order,
    wherein the scan order is based on a size of the CB.

6. The method of claim 5, wherein
    the scan order is the raster scan order, and
    the scan order of the TUs is the same as a scan order of coding blocks in the picture, the TUs being included in one of the coding blocks in the picture.

7. The method of claim 5, wherein
    W is 128, H is 64, and M is 32; and
    the scan order is the raster scan order.

8. The method of claim 1, wherein at least two TUs are configured to be processed simultaneously at different stages of a multi-stage pipeline.

9. The method of claim 1, wherein the determining comprises:
    determining which partitioning structure from among the plurality of partitioning structures is selected to partition the CB based on the width W of the CB, the height H of the CB, the maximum transform unit (TU) size M, and a comparison of the height H and the width W.

10. The method of claim 1, wherein the selected partitioning structure is the horizontal binary tree partitioning structure that partitions the CB into two partitions having sizes of W×H/2 in response to the height H being greater than the maximum TU size M and the height H being greater than the width W.

11. An apparatus for video decoding, comprising:
processing circuitry configured to:
 decode coded information of a coding block (CB) in a picture from a coded video bitstream, the coded information indicating a width of the CB as W samples and a height of the CB as H samples;
 determine a maximum transform unit (TU) size M based on whether at least one of the width W of the CB or the height H of the CB is greater than 64, the maximum TU size M being equal to 64 responsive to the at least one of the width W of the CB or the height H of the CB being greater than 64, and equal to a maximum CB size responsive to the width W of the CB and the height H of the CB not being greater than 64;
 determine a width parameter based on whether the width W of the CB is greater than the maximum TU size M, the width parameter being equal to half of the width W of the CB responsive to the width W of the CB being greater than the maximum TU size M, and the width parameter being equal to the width W of the CB responsive to the width W of the CB not being greater than the maximum TU size M;
 determine a height parameter based on whether the height H of the CB is greater than the maximum TU size M, the height parameter being equal to half of the height H of the CB responsive to the height H of the CB being greater than the maximum TU size M, and the height parameter being equal to the height H of the CB responsive to the height H of the CB not being greater than the maximum TU size;
 determine which partitioning structure from among plural partitioning structures is selected to partition the CB based on the width W of the CB, the height H of the CB, and the maximum TU size M, the selected partitioning structure partitioning the CB based on the determined width and height parameters and the plural partitioning structures comprising a vertical binary tree partitioning structure and a horizontal binary tree partitioning structure; and
 recursively partition the CB into a plurality of TUs until a size of each TU is less than or equal to M×M based on the partitioning structure that is determined as selected from among the plural partitioning structures.

12. The apparatus of claim 11, wherein
the plural partitioning structures further comprises a quadtree partitioning structure;
both the width W and the height H of the CB are larger than M; and
the processing circuitry is further configured to:
 select the partitioning structure to be the quadtree partitioning structure in the plural partitioning structures; and
 partition the CB into the TUs based on the quadtree partitioning structure.

13. The apparatus of claim 11, wherein
the maximum TU size M is 32;
the width W of the CB is 64 and the height H of the CB is equal to M; and
the processing circuitry is further configured to:
 select the partitioning structure to be the vertical binary tree partitioning structure in the plural partitioning structures; and
 partition the CB into two TUs based on the vertical binary tree partitioning structure, each TU having a size of 32×32.

14. The apparatus of claim 11, wherein
the maximum TU size M is 32;
the height H of the CB is 64 and the width W of the CB is equal to M; and
the processing circuitry is further configured to:
 select the partitioning structure to be the horizontal binary tree partitioning structure in the plural partitioning structures; and
 partition the CB into two TUs based on the horizontal binary tree partitioning structure, each TU having a size of 32×32.

15. The apparatus of claim 11, wherein the processing circuitry is further configured to:
process the TUs according to a scan order that is one of (i) a raster scan order, (ii) a vertical scan order, (iii) a zig-zag order, and (iv) a diagonal scan order,
wherein the scan order is based on a size of the CB.

16. The apparatus of claim 15, wherein
the scan order is the raster scan order, and
the scan order of the TUs is the same as a scan order of coding blocks in the picture, the TUs being included in one of the coding blocks in the picture.

17. The apparatus of claim 15, wherein
W is 128, H is 64, and M is 32; and
the scan order is the raster scan order.

18. The apparatus of claim 11, wherein the selected partitioning structure is the horizontal binary tree partitioning structure that partitions the CB into two partitions having sizes of W×H/2 in response to the height H being greater than the maximum TU size M and the height H being greater than the width W.

19. The apparatus of claim 15, wherein a scan order of coding blocks in the picture is another one of (i) the raster scan order, (ii) the vertical scan order, (iii) the zig-zag order, and (iv) the diagonal scan order, the TUs being included in one of the coding blocks in the picture.

20. A non-transitory computer-readable storage medium storing a program executable by at least one processor to:
decode coded information of a coding block (CB) in a picture from a coded video bitstream, the coded information indicating a width of the CB as W samples and a height of the CB as H samples;
determine a maximum transform unit (TU) size M based on whether at least one of the width W of the CB or the height H of the CB is greater than 64, the maximum TU size M being equal to 64 responsive to the at least one of the width W of the CB or the height H of the CB being greater than 64, and equal to a maximum CB size responsive to the width W of the CB and the height H of the CB not being greater than 64;
determine a width parameter based on whether the width W of the CB is greater than the maximum TU size M, the width parameter being equal to half of the width W of the CB responsive to the width W of the CB being greater than the maximum TU size M, and the width parameter being equal to the width W of the CB responsive to the width W of the CB not being greater than the maximum TU size M;
determine a height parameter based on whether the height H of the CB is greater than the maximum TU size M, the height parameter being equal to half of the height H of the CB responsive to the height H of the CB being greater than the maximum TU size M, and the height parameter being equal to the height H of the CB responsive to the height H of the CB not being greater than the maximum TU size;

determine which partitioning structure from among plural partitioning structures is selected to partition the CB based on the width W of the CB, the height H of the CB, and the maximum size M, the selected partitioning structure partitioning the CB based on the determined width and height parameters and the plural partitioning structures comprising a vertical binary tree partitioning structure and a horizontal binary tree partitioning structure; and recursively partition the CB into a plurality of TUs until a size of each TU is less than or equal to M×M based on the partitioning structure that is determined as selected from among the plural partitioning structures.

* * * * *